//<br>US 9,586,470 B2

United States Patent
Park et al.

(10) Patent No.: US 9,586,470 B2
(45) Date of Patent: Mar. 7, 2017

(54) POWERTRAIN FOR HYBRID VEHICLE

(71) Applicant: Hyundai Motor Company, Seoul (KR)

(72) Inventors: Jong Yun Park, Hwaseong-Si (KR); Jae Young Choi, Busan (KR); Kyung Ha Kim, Yongin-Si (KR); Ki Nam Kim, Seongnam-Si (KR); Eui Cheol Chung, Seoul (KR)

(73) Assignee: Hyundai Motor Company, Seoul (KR)

( * ) Notice: Subject to any disclaimer, the term of this patent is extended or adjusted under 35 U.S.C. 154(b) by 57 days.

(21) Appl. No.: 14/541,400

(22) Filed: Nov. 14, 2014

(65) Prior Publication Data

US 2015/0321545 A1 Nov. 12, 2015

(30) Foreign Application Priority Data

May 9, 2014 (KR) .................. 10-2014-0055519

(51) Int. Cl.
| | | |
|---|---|---|
| F16H 3/00 | (2006.01) | |
| B60K 6/365 | (2007.10) | |
| B60W 20/00 | (2016.01) | |
| B60K 6/547 | (2007.10) | |
| F16H 3/46 | (2006.01) | |
| F16H 59/44 | (2006.01) | |
| B60K 6/387 | (2007.10) | |
| B60K 6/48 | (2007.10) | |

(52) U.S. Cl.
CPC .............. *B60K 6/547* (2013.01); *B60K 6/365* (2013.01); *B60K 6/387* (2013.01); *B60K 6/48* (2013.01);
(Continued)

(58) Field of Classification Search
CPC ....... F16H 2003/008; F16H 2200/2094; F16H 2200/0052
See application file for complete search history.

(56) References Cited

U.S. PATENT DOCUMENTS 8,043,187 B2 * 10/2011 Yang .................... F16H 37/046
475/215
8,517,876 B2 * 8/2013 Sakai .................... B60K 6/387
475/5
(Continued)

FOREIGN PATENT DOCUMENTS

| JP | 2010-144775 A | 7/2010 |
|---|---|---|
| JP | 2010-285012 A | 12/2010 |

(Continued)

*Primary Examiner* — Jacob S Scott
*Assistant Examiner* — Tinh Dang
(74) *Attorney, Agent, or Firm* — Morgan, Lewis & Bockius LLP

(57) ABSTRACT

A hybrid vehicle powertrain may include input shafts, clutches, output shafts, a transmission path selector, a planetary gear unit, and a gear stage forming mechanism. The transmission path selector may bring engagement of a first input shaft with second or third input shaft. The planetary gear unit may have three rotary elements, with motor power or engine power being input via a first or second rotary element and being output with any one of two transmission gear ratios under the control of first or third rotary element in response to engagement of first and second engaging units. The gear stage forming mechanism may be formed by engagement of gear pairs having different transmission gear ratios with second and third input shafts and a first output shaft, and function to transmit the power from the second or third input shaft to the first output shaft while changing a speed by selecting a gear pair in accordance with a vehicle running speed using a gear pair selector.

17 Claims, 41 Drawing Sheets

(52) U.S. Cl.
CPC ............ *B60W 20/30* (2013.01); *B60W 20/40* (2013.01); *F16H 3/46* (2013.01); *F16H 59/44* (2013.01); *B60K 2006/4825* (2013.01); *B60K 2006/4841* (2013.01); *F16H 3/006* (2013.01); *F16H 2003/008* (2013.01); *F16H 2200/0056* (2013.01); *F16H 2200/2094* (2013.01); *Y02T 10/6221* (2013.01); *Y02T 10/6252* (2013.01); *Y10S 903/919* (2013.01)

(56) References Cited

U.S. PATENT DOCUMENTS

| | | | | |
|---|---|---|---|---|
| 8,790,202 | B2* | 7/2014 | Sakai | B60K 6/365 475/5 |
| 9,186,978 | B2* | 11/2015 | Park | B60K 6/547 475/5 |
| 2003/0045389 | A1 | 3/2003 | Kima | |
| 2012/0259496 | A1* | 10/2012 | Ikegami | B60K 6/365 701/22 |
| 2013/0109530 | A1* | 5/2013 | Kaltenbach | B60K 6/387 477/5 |
| 2013/0210567 | A1 | 8/2013 | Puiu | |
| 2013/0337972 | A1* | 12/2013 | Lee | B60W 20/40 477/5 |
| 2014/0038762 | A1 | 2/2014 | Wechs | |
| 2015/0165888 | A1* | 6/2015 | Lee | B60K 6/48 475/5 |

FOREIGN PATENT DOCUMENTS

| | | |
|---|---|---|
| JP | 2012-519617 A | 8/2012 |
| KR | 10-2006-0108130 A | 10/2006 |
| KR | 10-2008-0033700 | 4/2008 |

\* cited by examiner first gear driving second gear driving third gear driving third gear driving fourth gear driving fourth gear driving fifth gear driving fifth gear driving sixth gear driving sixth gear driving seventh gear driving third gear driving first gear driving fourth gear driving second gear driving first gear second gear fourth gear fifth gear sixth gear reverse gear

POWERTRAIN FOR HYBRID VEHICLE

CROSS REFERENCE TO RELATED APPLICATION

The present application claims priority of Korean Patent Application Number 10-2014-0055519 filed on May 9, 2014, the entire contents of which application are incorporated herein for all purposes by this reference.

BACKGROUND OF INVENTION

Field of Invention

The present invention relates, in general, to a powertrain for a hybrid vehicle and, more particularly, to a powertrain for a hybrid vehicle which can reduce the number of gear pairs, used to form gear stages, by removing an engine clutch from a transmission and by combining a planetary gear unit with the gear pairs, thereby reducing the production cost and weight of the transmission, and which can directly downshift the transmission into a target lower gear when performing kickdown, so the powertrain can realize improved gear shifting performance.

Description of Related Art

Parallel hybrid systems for hybrid electric vehicles (HEV) are typically classified into FMED (Flywheel-Mounted Electric Device) systems and TMED (Transmission-Mounted Electric Device) systems according to locations of motors in the systems.

FIG. 1 shows a conventional TMED hybrid system, in which a motor is connected to a transmission and which can perform an EV mode (Electric Vehicle mode) in which the system drives a vehicle using motor power exclusively.

In the EV mode, the TMED hybrid system drives the vehicle using only the motor power when the vehicle is started or runs at a low speed. In the EV mode, an engine clutch is disengaged, and only the rotating force of the motor is transmitted to the wheels, so the vehicle is driven by the motor power exclusively.

In addition, in an HEV (Hybrid Electric Vehicle) mode, the system drives the vehicle using both the engine power and the motor power. Here, when a driver changes the mode from the EV mode to the HEV mode while driving the vehicle in the EV mode, a high level of shock may be generated at the moment the engine power is coupled to the motor power. To prevent the generation of shock when changing the mode, the system synchronizes the engine rpm with the motor rpm after the engine is started, and engages the engine clutch so that the motor and the engine can be efficiently coupled together.

However, the conventional hybrid powertrain having the above-mentioned construction is problematic in that the engine clutch is added to between the engine and the motor, thereby causing a problem in packaging the hybrid powertrain components and increasing the production cost of the transmission.

Further, for a vehicle equipped with an AMT (Automated Manual Transmission) or a DCT (Dual-Clutch Transmission), both transmissions having manual gearbox mechanisms, external gear pairs are provided to realize respective gear stages, thereby increasing the production cost and weight of the transmission and causing a problem in packaging the hybrid powertrain components. Furthermore, when performing kickdown, gears are sequentially shifted (for example, fourth gear→third gear→second gear, third gear→second gear→first gear), thereby causing a delay in gear shifting response and reducing the performance of gear shifting response.

In addition, although the vehicle having the hybrid powertrain is operated in the EV mode when the vehicle is started or runs at a low speed, the period the vehicle runs in the EV mode is short, thereby limiting an increase in fuel efficiency of the vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide a hybrid vehicle powertrain that can reduce the number of gear pairs, used to form gear stages, by removing an engine clutch from a transmission and by combining a planetary gear unit with the gear pairs, so the hybrid vehicle powertrain can reduce the production cost and weight of the transmission. The present invention is also intended to provide a hybrid vehicle powertrain that can directly downshift to a target lower gear when performing kickdown, so the powertrain can realize improved gear shifting performance.

According to various aspects of the present invention, there is provided a hybrid vehicle powertrain, including: a first input shaft and a second input shaft, which are rotatably and concentrically installed and to which a rotating force of an engine is transmitted under control of a first clutch and a second clutch; a third input shaft rotatably and concentrically installed relative to the first input shaft; a transmission path selector that brings engagement of the first input shaft with the second input shaft or with the third input shaft, thereby transmitting a rotating force of the first input shaft to the second input shaft or to the third input shaft; a planetary gear unit which includes first, second and third rotary elements, and to which a rotating force of a motor or the rotating force of the engine is input via the first rotary element or the second rotary element, and from which the input rotating force is output with any one of two transmission gear ratios under control of the first rotary element or the third rotary element in response to engagement of a first engaging unit and a second engaging unit; a first output shaft installed parallel to both the second input shaft and the third input shaft; and a gear stage forming mechanism formed by engagement of a plurality of gear pairs having different transmission gear ratios with the second input shaft, the third input shaft and the first output shaft, and transmitting the rotating force from the second input shaft or from the third input shaft to the first output shaft while changing a speed by selecting a gear pair in accordance with a vehicle running speed using a gear pair selector.

The hybrid vehicle powertrain may further include: a second output shaft installed parallel to both the second input shaft and the third input shaft, wherein the gear stage forming mechanism may be formed by the engagement of the plurality of gear pairs having the different transmission gear ratios with the second input shaft, the third input shaft and the first output shaft, and may include the gear pair selector functioning to select the gear pair in accordance with the vehicle running speed.

The second input shaft and the third input shaft may be configured as hollow shafts that are fitted over the first input shaft, the third input shaft may face the second input shaft, and the transmission path selector may be installed on the first input shaft at a location between the second input shaft and the third input shaft such that the transmission path selector is restricted from rotating relative to the first input shaft.

The transmission path selector may be a synchromesh mechanism.

The planetary gear unit may be arranged such that the planetary gear unit is concentric with the first input shaft, wherein the first rotary element may be coupled to both the motor and the first engaging unit, and may function as a selective input element or a selective fixed element, the second rotary element may be coupled to the first input shaft, and may function as a selective input element, and the third rotary element may be coupled to the third input shaft, and may be selectively coupled to the motor by the second engaging unit, and may function as an output element.

The first rotary element may be a sun gear, the second rotary element may be a carrier, and the third rotary element may be a ring gear.

The first clutch and the second clutch may be installed on a first end of the first input shaft, and the motor may be configured to surround the planetary gear unit and may be concentrically installed on a second end of the first input shaft.

The first engaging unit may be configured such that the first engaging unit selectively brakes the sun gear, and the second engaging unit may be configured such that the second engaging unit selectively transmits the rotating force of the motor to the ring gear.

The first engaging unit may be installed at a location between an inner surface of a transmission housing and the sun gear such that the first engaging unit is selectively engaged with the inner surface of the transmission housing or with the sun gear, and the second engaging unit may be installed at a location between the motor and the third input shaft such that the second engaging unit is selectively engaged with the motor or with the third input shaft.

The first engaging unit and the second engaging unit may be dog clutches.

In the gear stage forming mechanism, gear pairs designated to form a first gear and gear pairs designated to form a third gear may be provided on different input shafts and different output shafts, respectively, and gear pairs designated to form a second gear and gear pairs designated to form a fourth gear may be provided on different input shafts and different output shafts, respectively.

The gear pairs designated to form the first gear may be provided to mesh with both the second input shaft and the first output shaft, while the gear pairs designated to form the third gear may be provided to mesh with both the third input shaft and the second output shaft, and the gear pairs designated to form the second gear may be provided to mesh with both the third input shaft and the second output shaft, while the gear pairs designated to form the fourth gear may be provided to mesh with both the second input shaft and the first output shaft.

Gear pairs designated to form two different gears may include a common gear pair, so that the rotating force may be output with different transmission gear ratios using the common gear pair according to the transmission gear ratios output from the planetary gear unit.

A first common gear pair may be commonly included in gear pairs designated to form a second gear and in gear pairs designated to form a third gear, and commonly used when forming the second gear or the third gear. A second common gear pair may be commonly included in gear pairs designated to form a fifth gear and in gear pairs designated to form a seventh gear, and commonly used when forming the fifth gear or the seventh gear.

The first common gear pair commonly included in the gear pairs designated to form the second gear and in the gear pairs designated to form the third gear may be installed to mesh with both the third input shaft and the second output shaft, and the second common gear pair commonly included in the gear pairs designated to form the fifth gear and in the gear pairs designated to form the seventh gear may be installed to mesh with both the third input shaft and the first output shaft.

The hybrid vehicle powertrain may further include: a reverse idler shaft installed parallel to the second input shaft; a reverse idler gear rotatably provided on the reverse idler shaft; and a reverse output gear provided on the first output shaft such that the reverse output gear meshes with the reverse idler gear.

The reverse idler gear may be configured to mesh with an input gear of the gear pairs provided in the gear stage forming mechanism.

The hybrid vehicle powertrain of the present invention is advantageous in that it can selectively provide two different transmission gear ratios using a planetary gear unit, thereby realizing two gear stages using one gear pair, so the powertrain can be free from use of some gear pairs for forming some gear stages, thereby removing the some gear pairs from a transmission. Further, in the powertrain, a motor is installed in the rear part of the transmission, so the powertrain is free from use of an engine clutch, thereby reducing the production cost and weight of the transmission, and being advantageous in packaging hybrid powertrain components.

Further, when downshifting in kickdown, the powertrain of the present invention can directly shift from third to first gear or from fourth to second gear, so the powertrain can realize improved gear shifting performance in kickdown.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
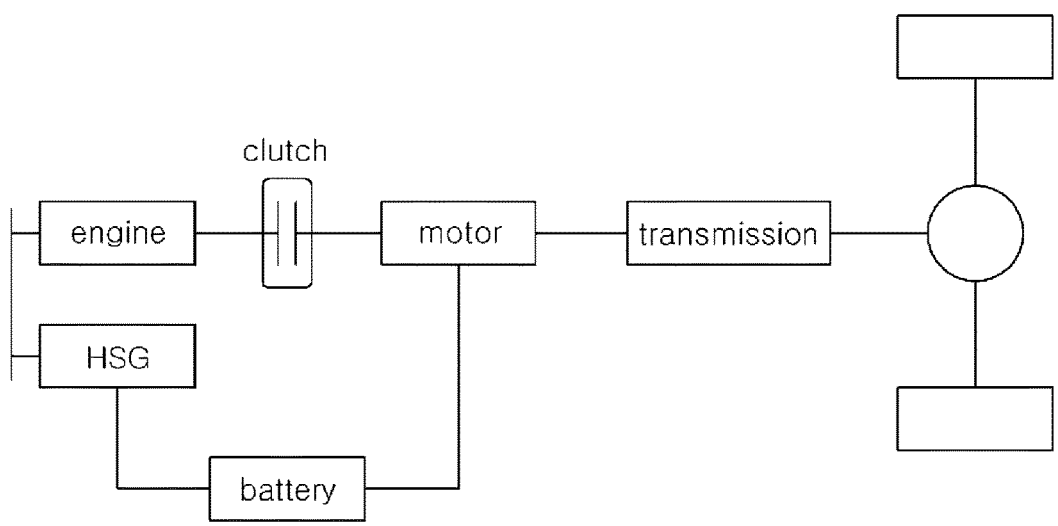
FIG. 1 is a block diagram illustrating the construction of a conventional hybrid vehicle powertrain.
Figure 2:
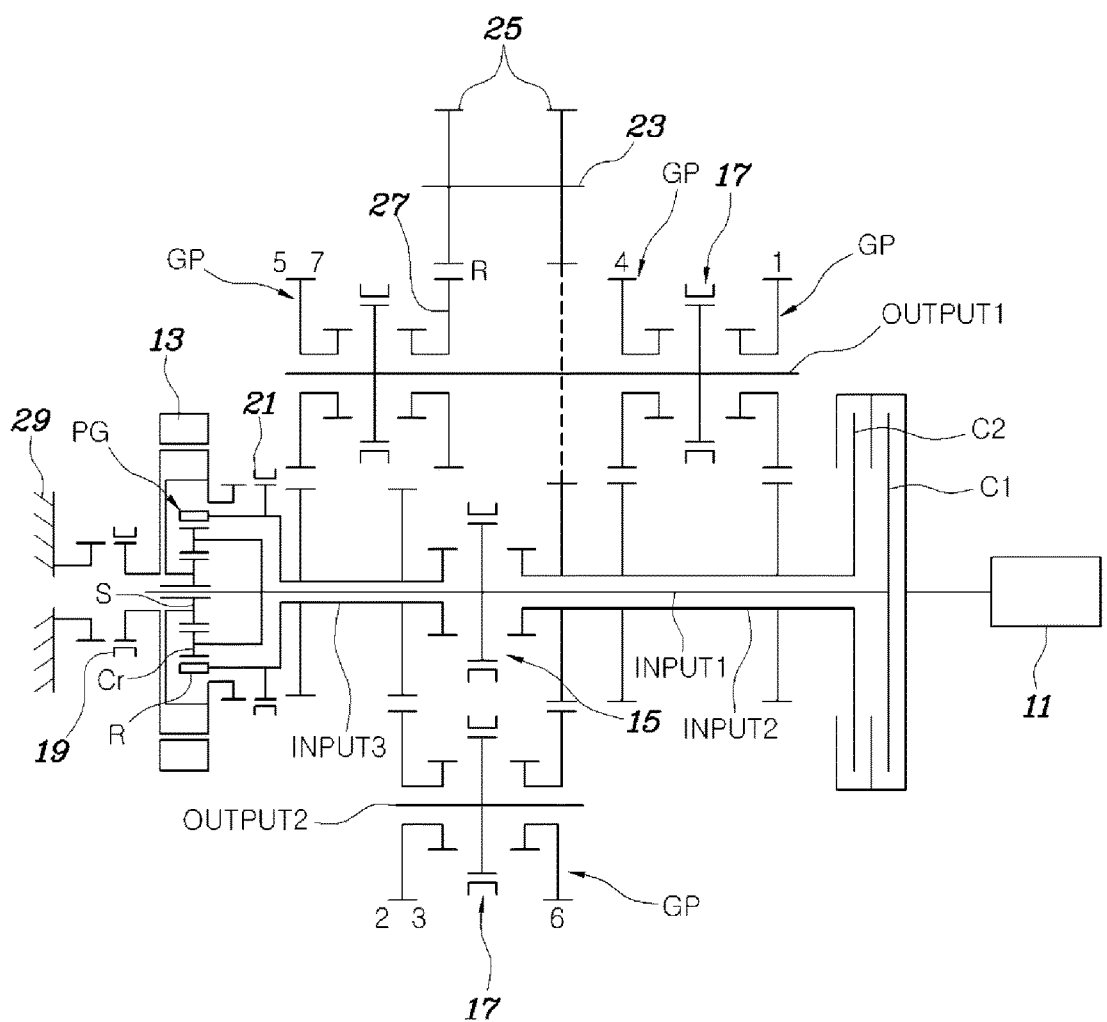
FIG. 2 is a block diagram illustrating the construction of an exemplary hybrid vehicle powertrain according to the present invention.
Figure 3A:
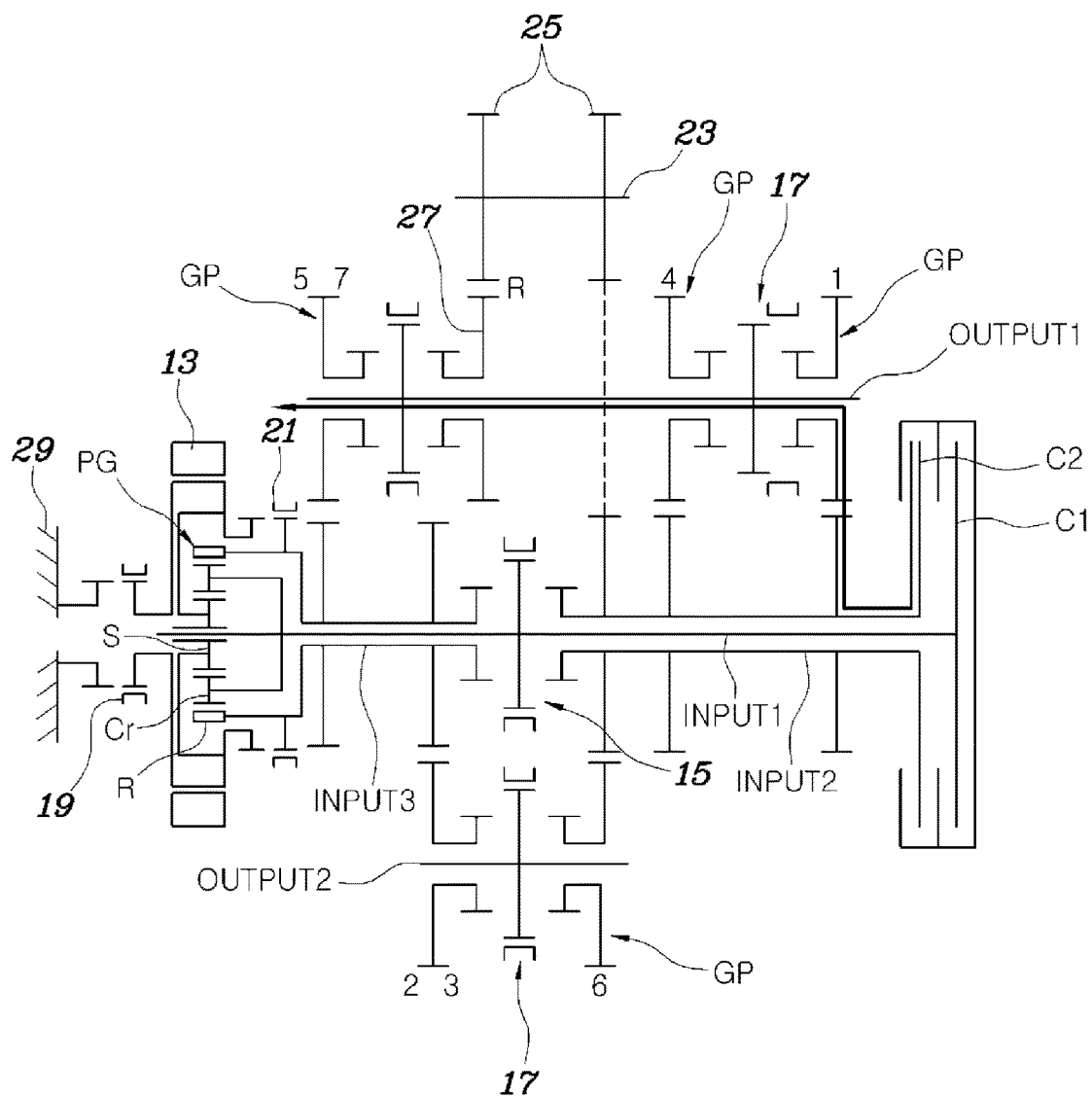
FIGS. 3A, 3B, 3C, 3D are views illustrating a procedure when upshifting from first to second gear in an exemplary hybrid vehicle powertrain according to the present invention.
Figure 3B:
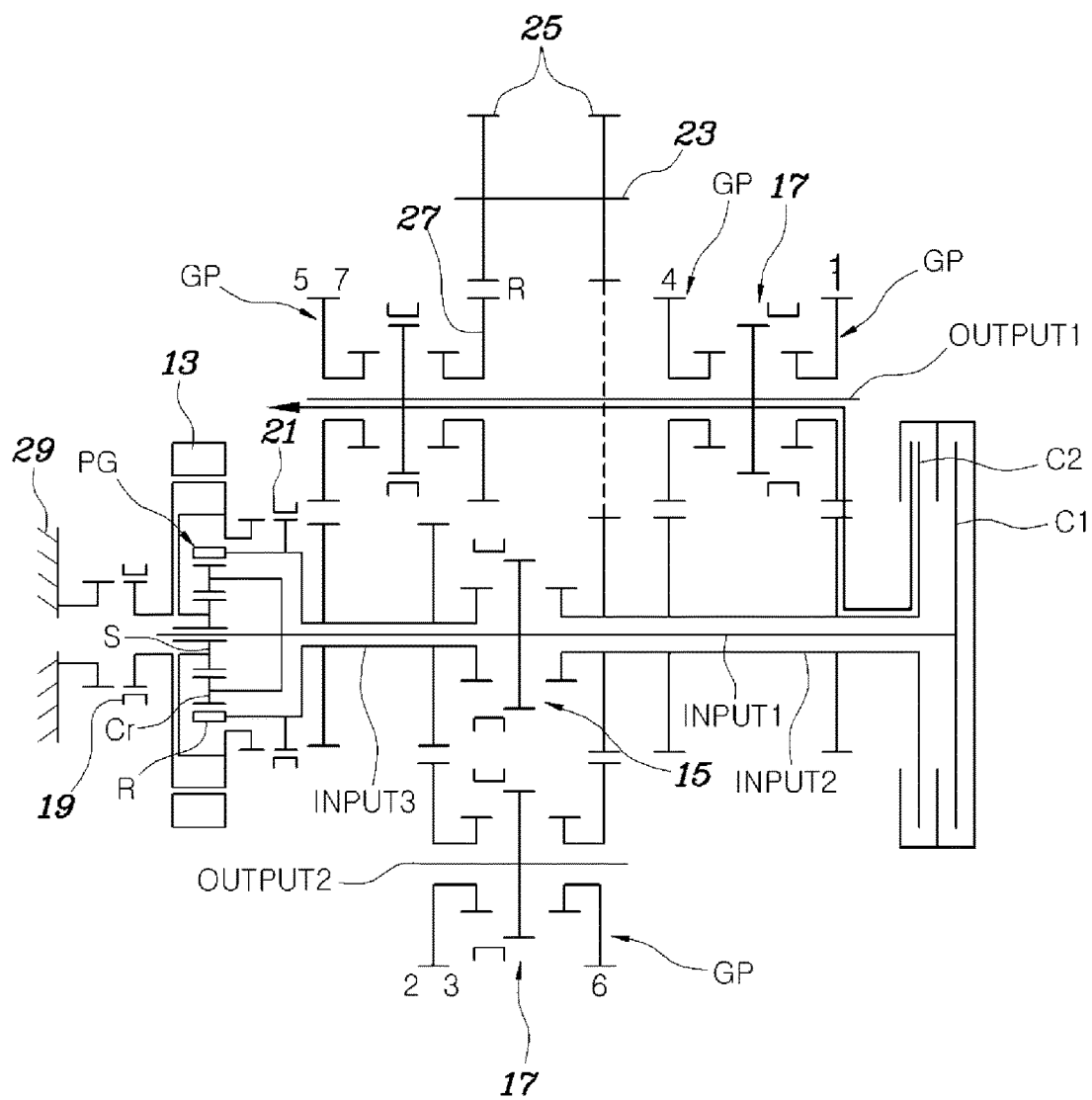
Figure 3C:
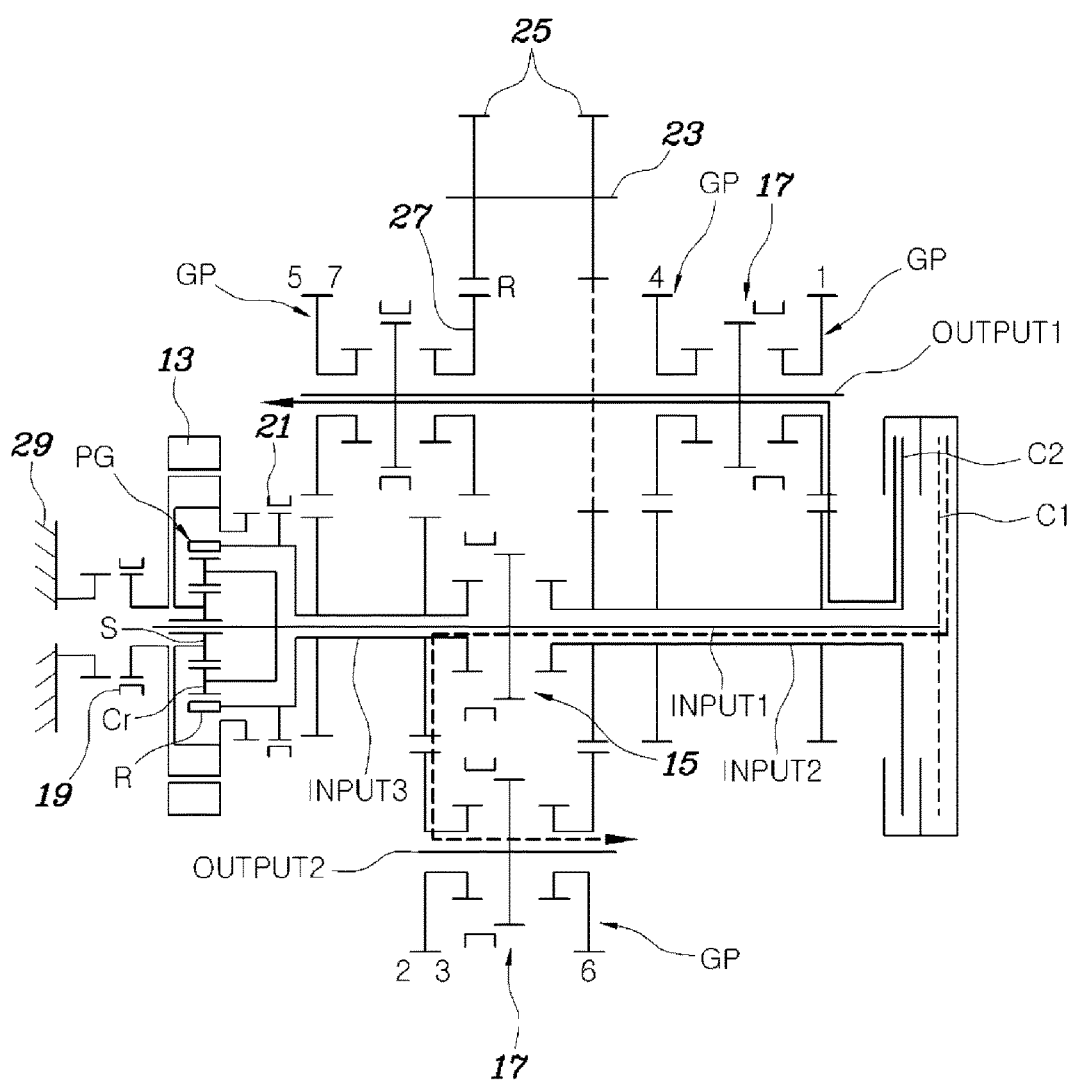
Figure 3D:
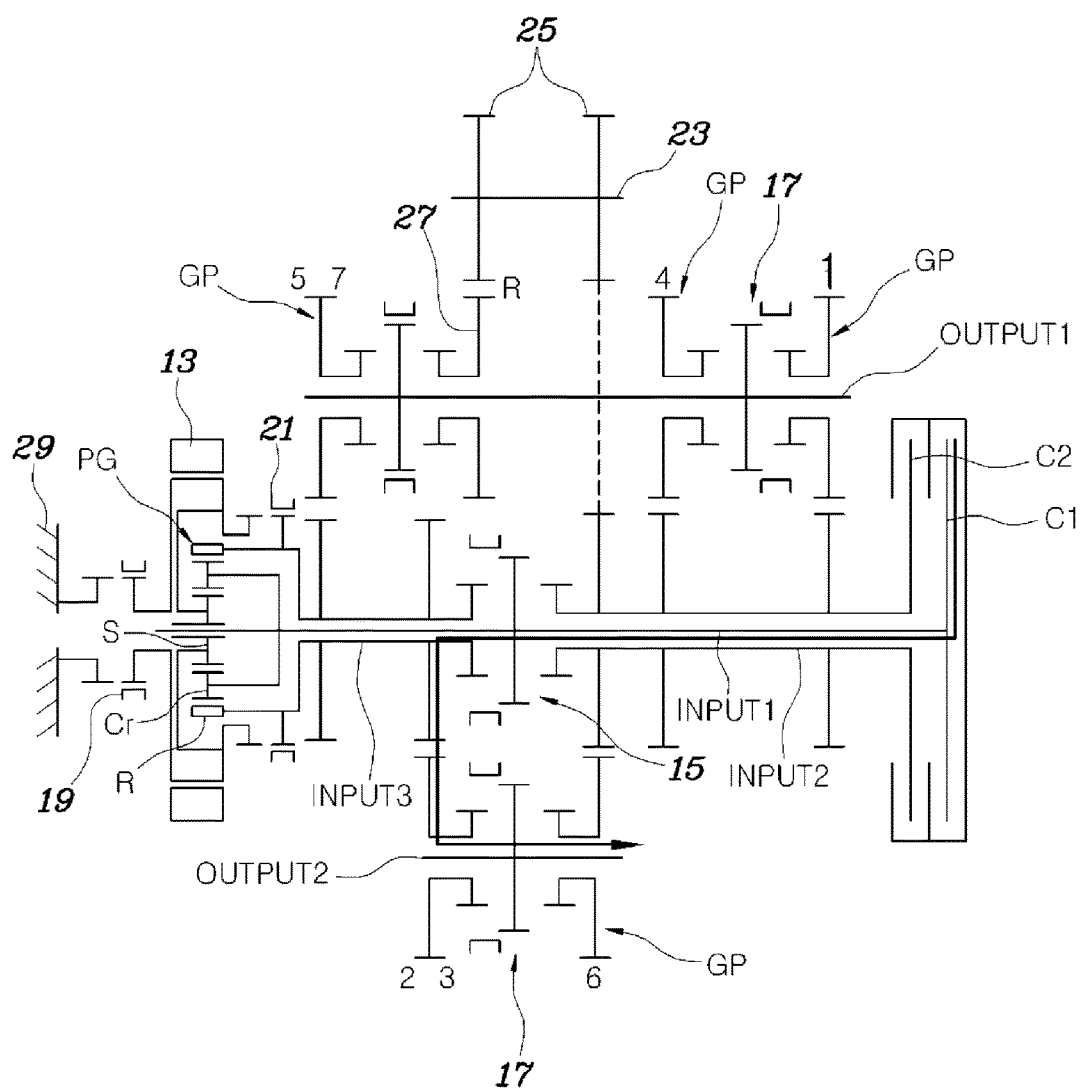
Figure 4A:
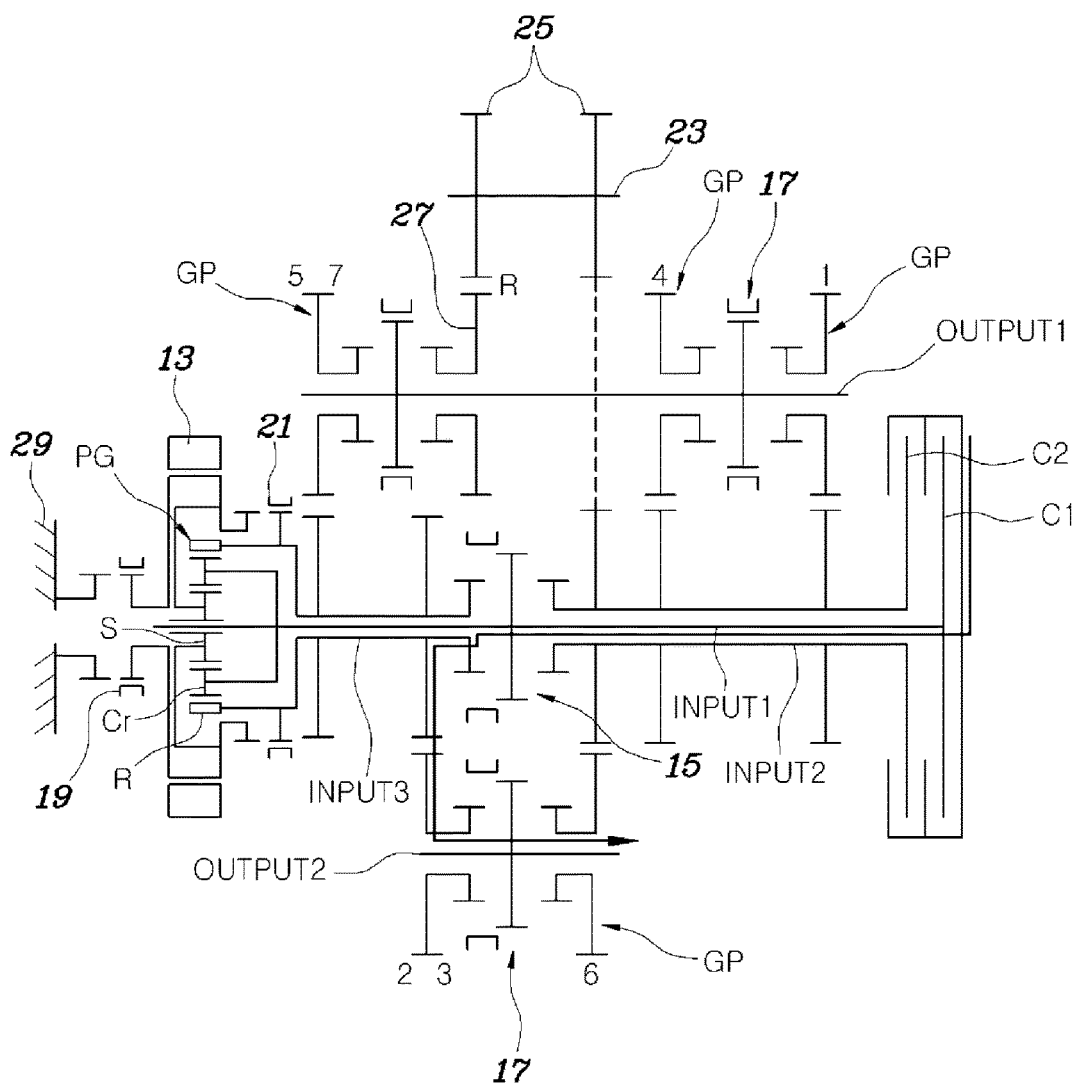
FIGS. 4A, 4B, 4C and 4D are views illustrating a procedure when upshifting from second to third gear in an exemplary hybrid vehicle powertrain according to the present invention.
Figure 4B:
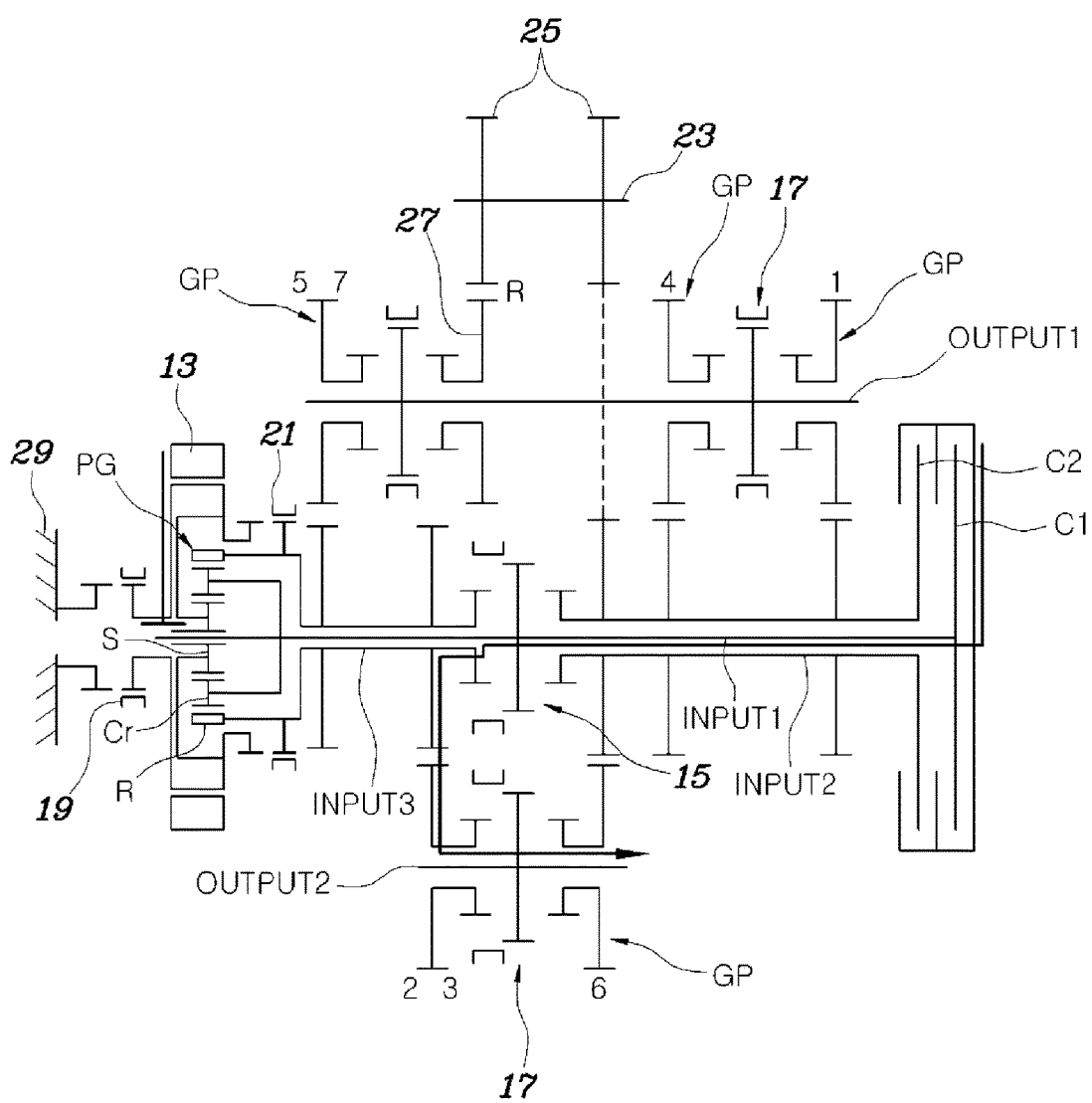
Figure 4C:
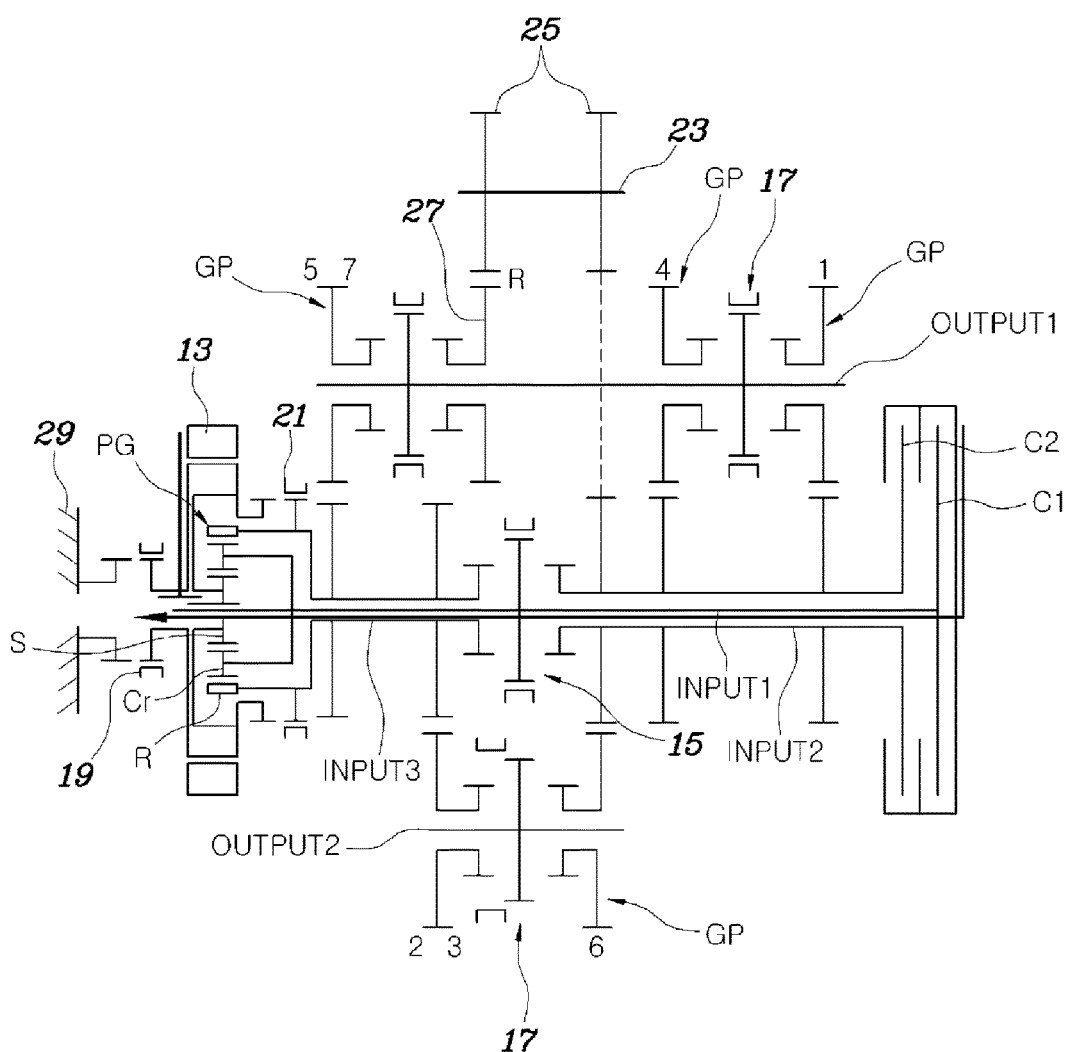
Figure 4D:
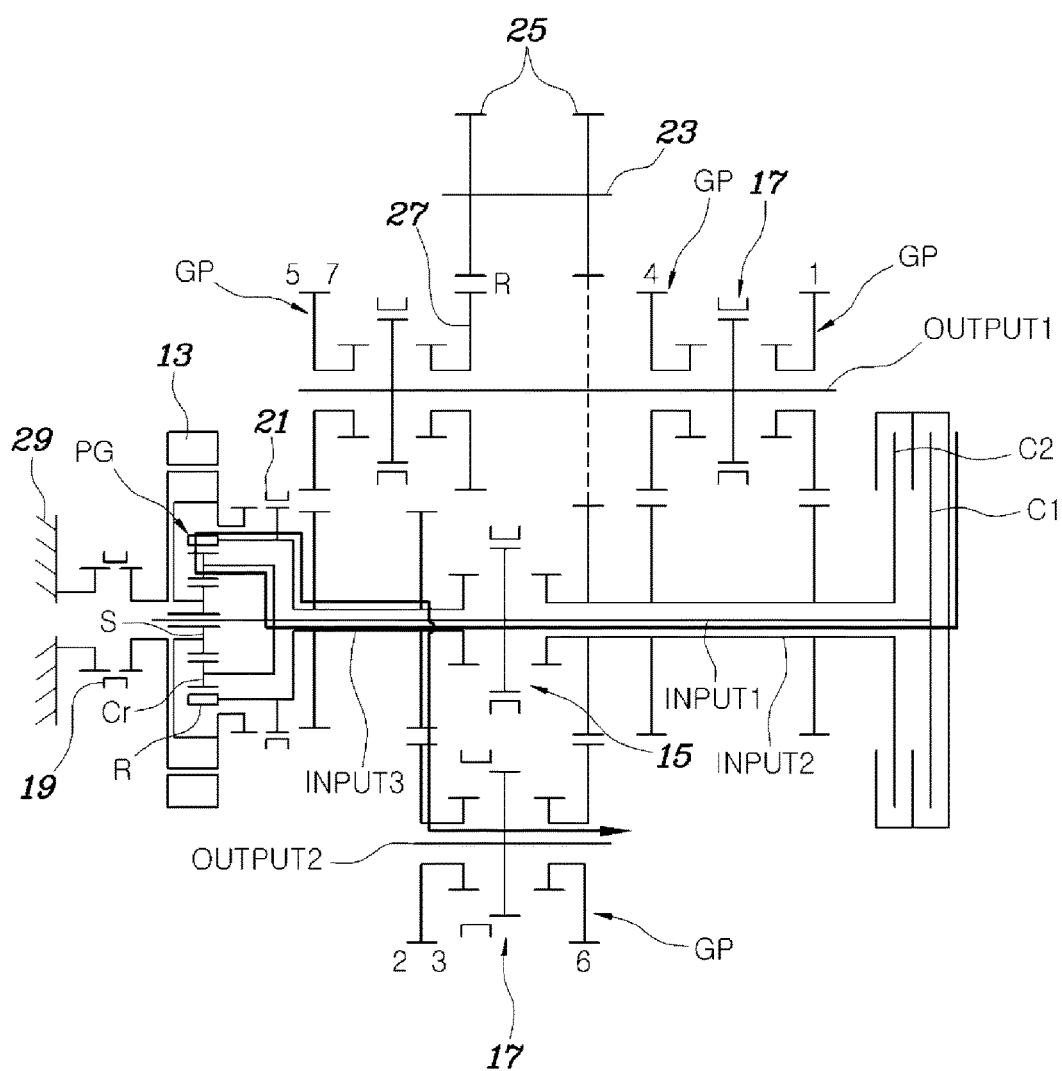
Figure 5A:
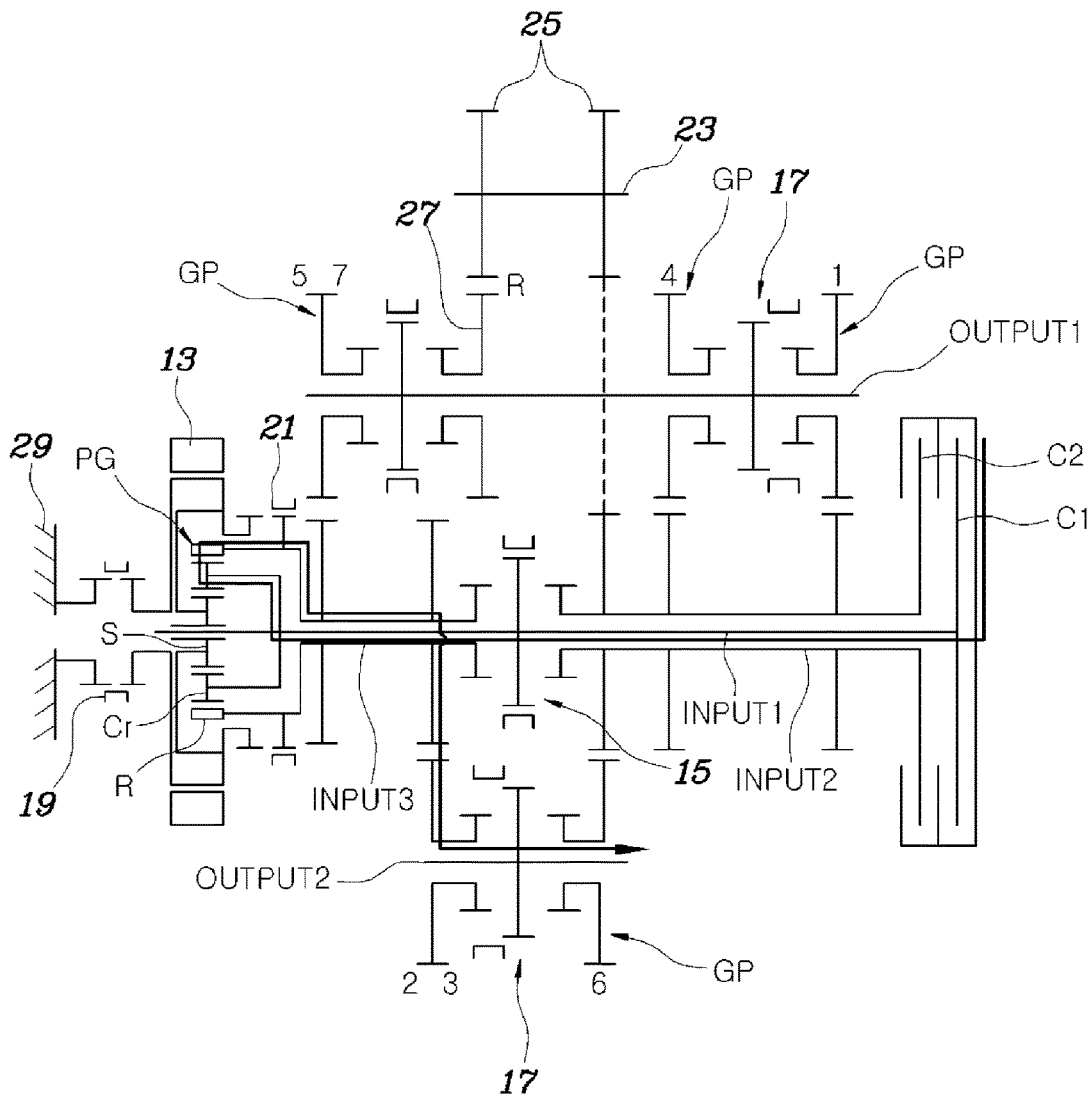
FIGS. 5A, 5B, 5C and 5D are views illustrating a procedure when upshifting from third to fourth gear in an exemplary hybrid vehicle powertrain according to the present invention.
Figure 5B:
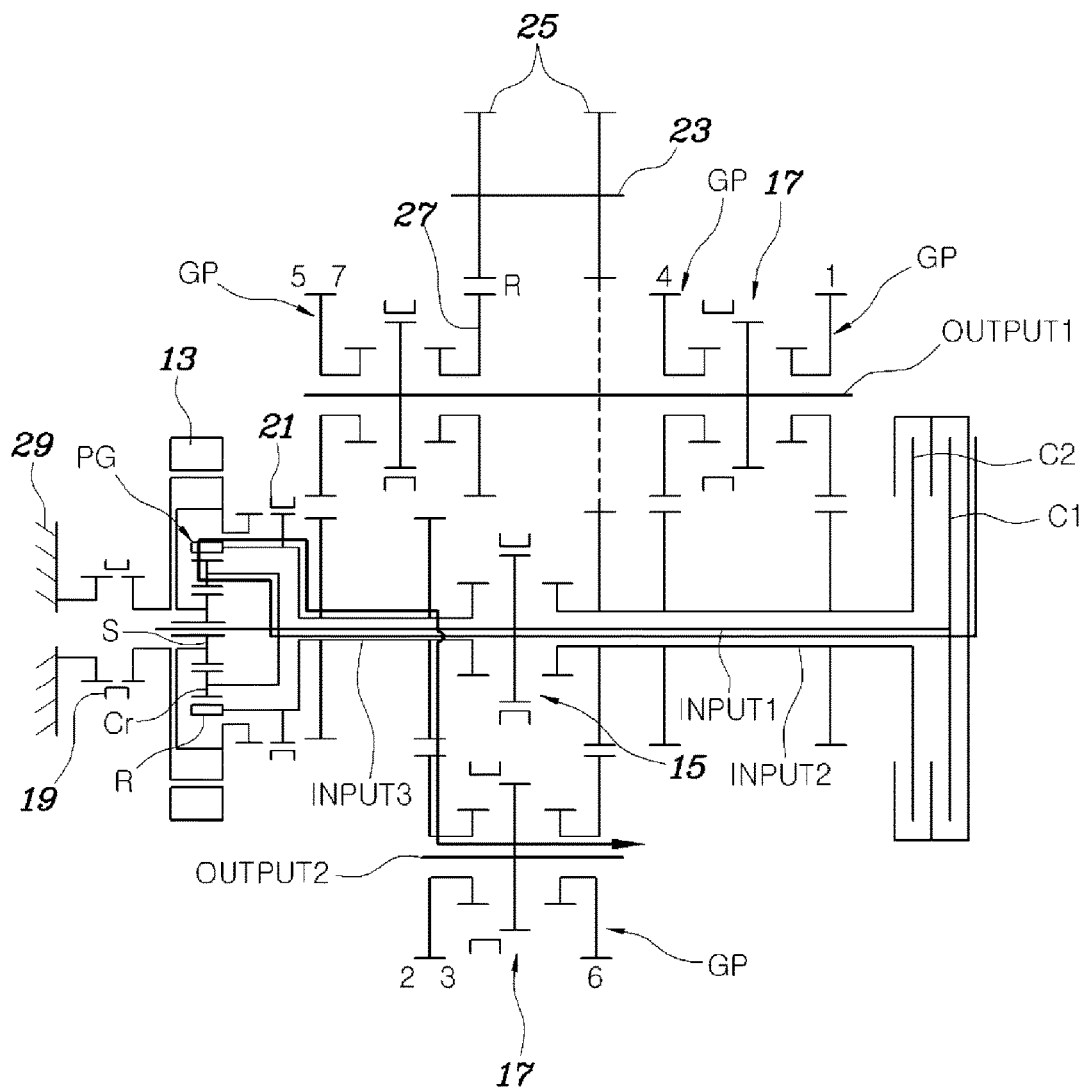
Figure 5C:
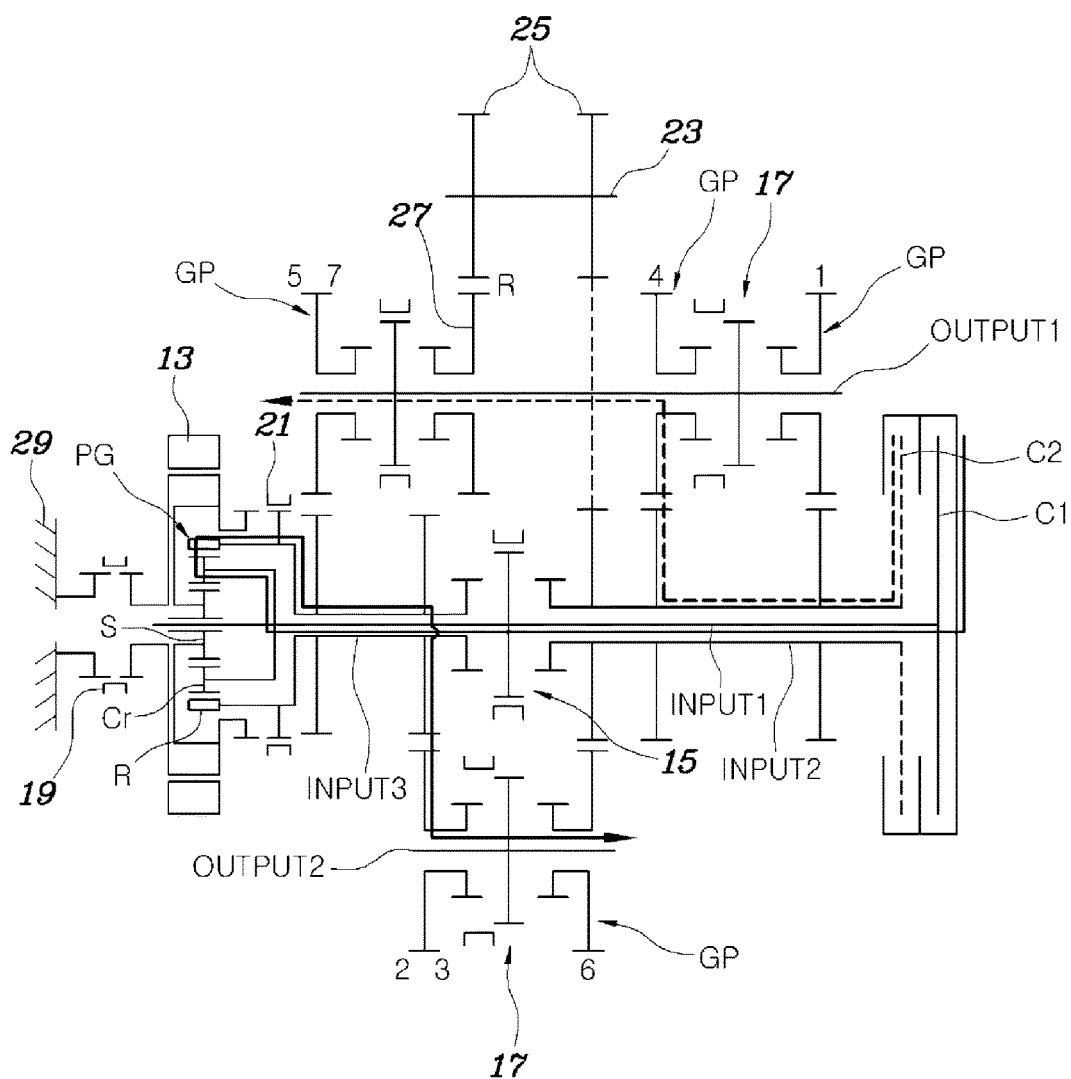
Figure 5D:
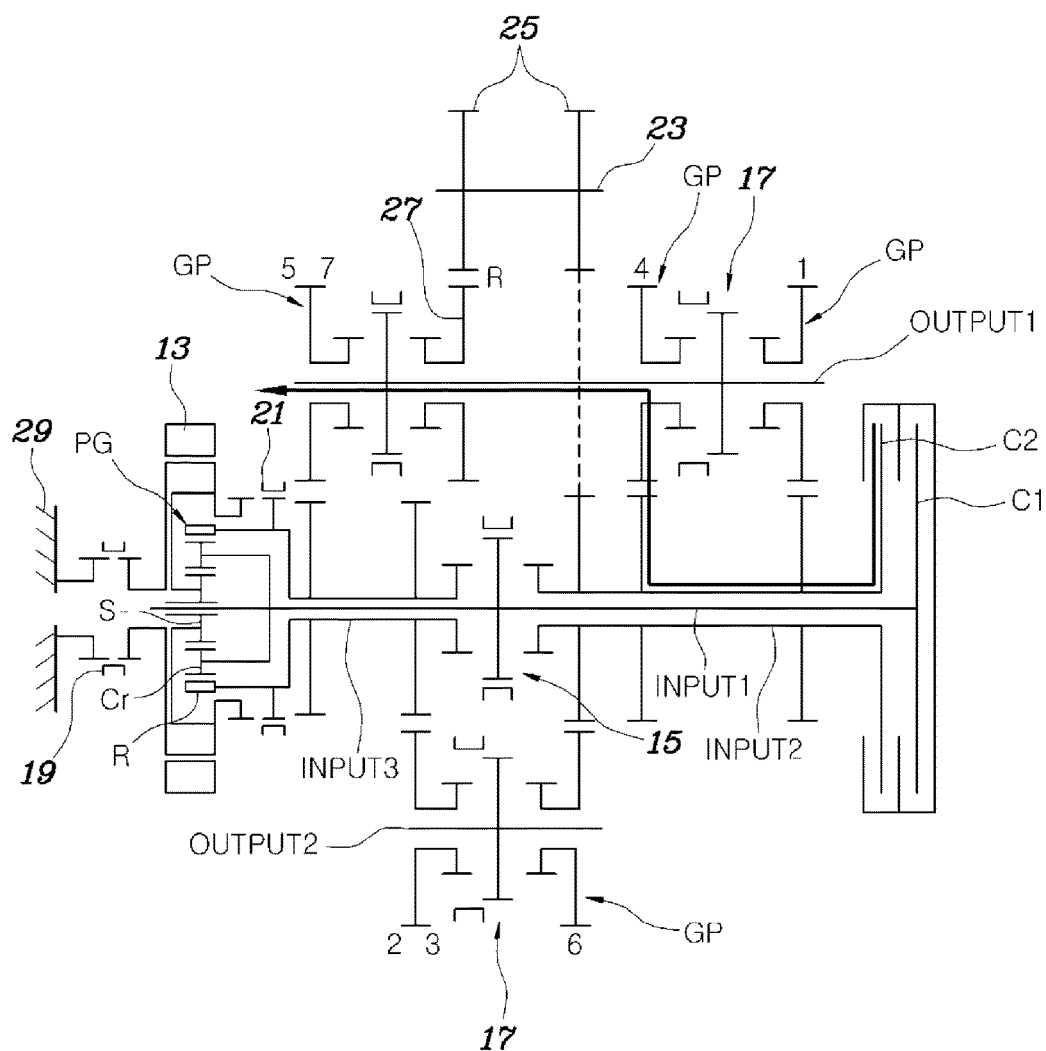
Figure 6A:
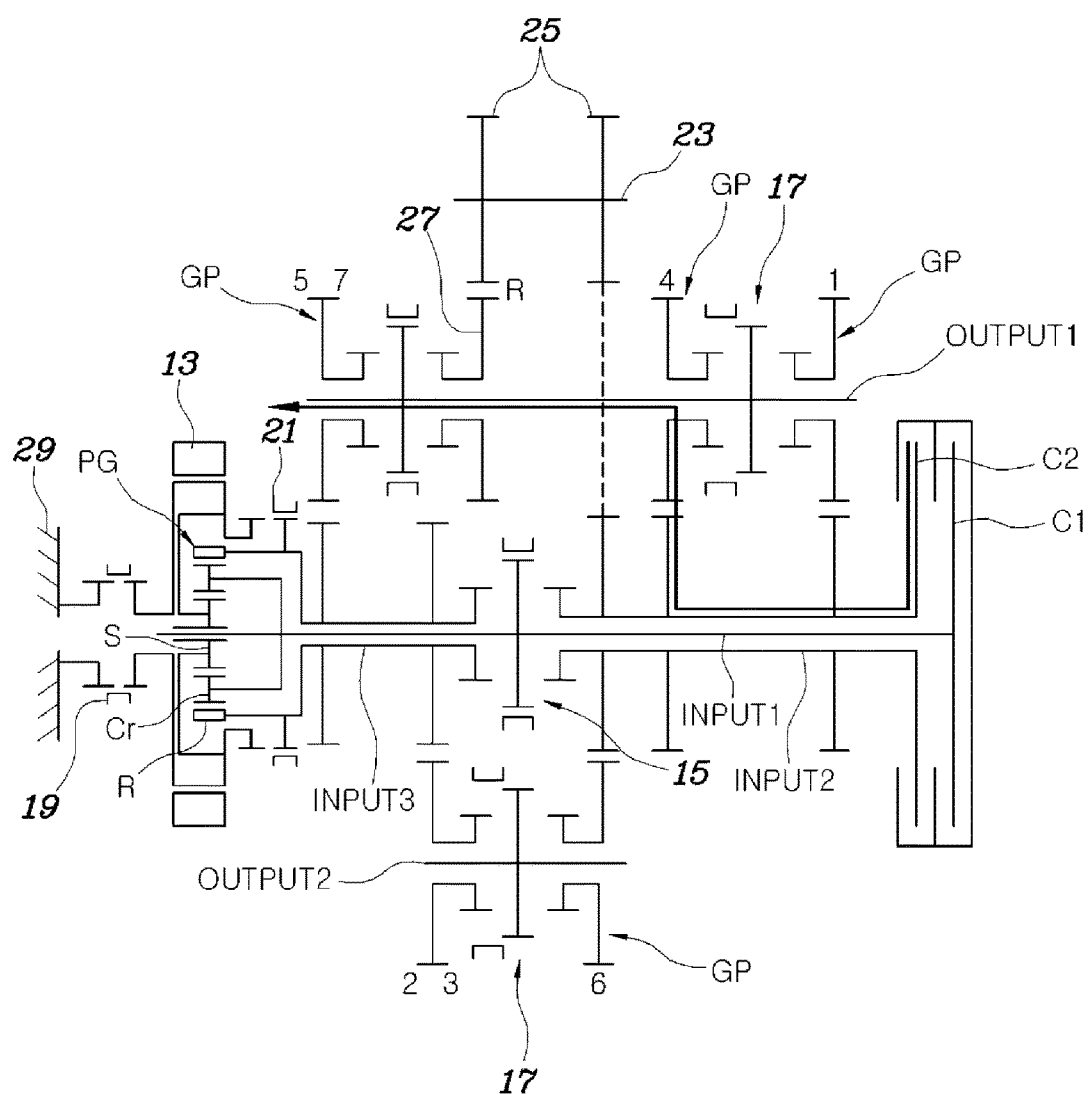
FIGS. 6A, 6B, 6C, and 6D are views illustrating a procedure when upshifting from fourth to fifth gear according to the present invention.
Figure 6B:
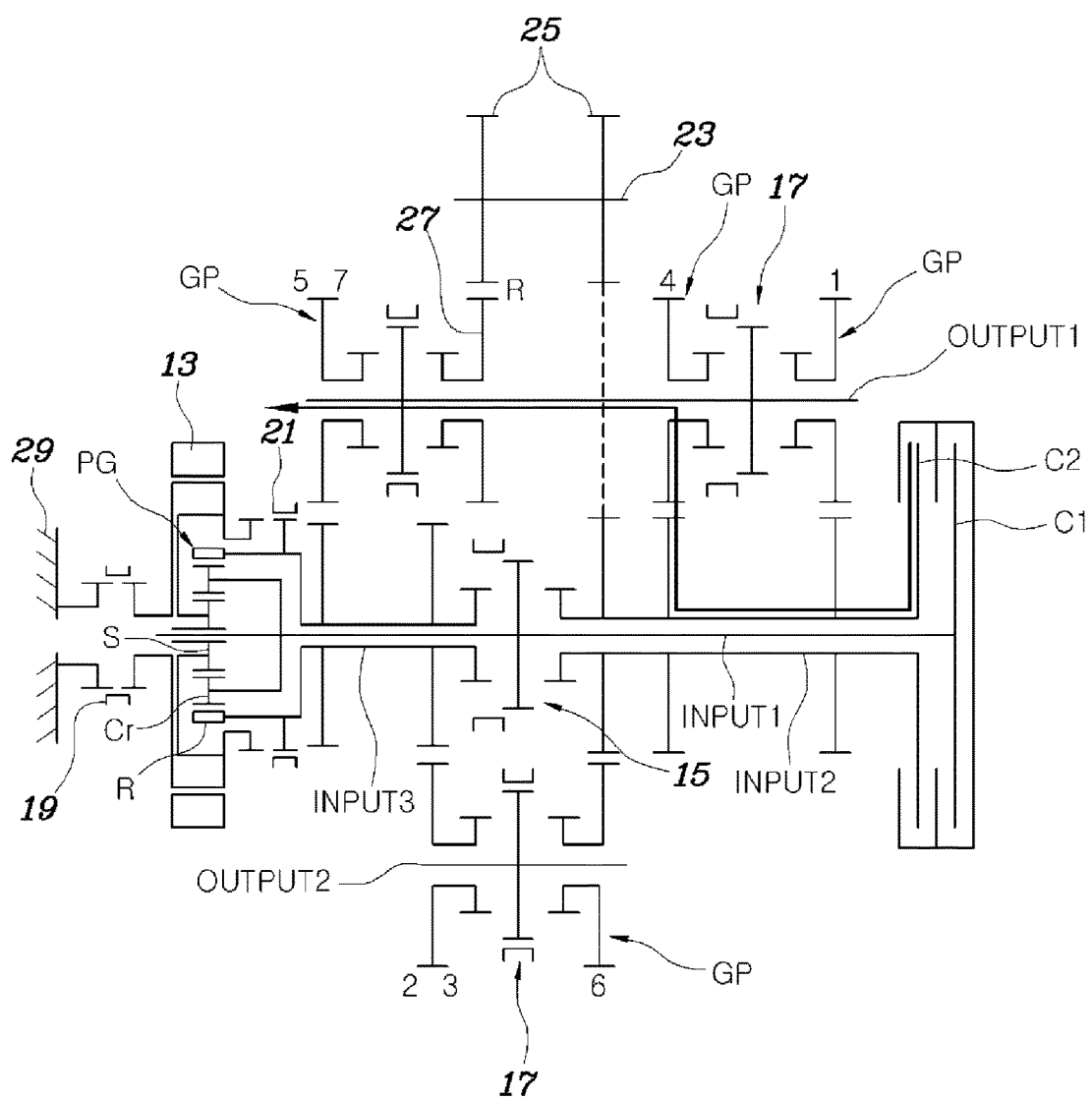
Figure 6C:
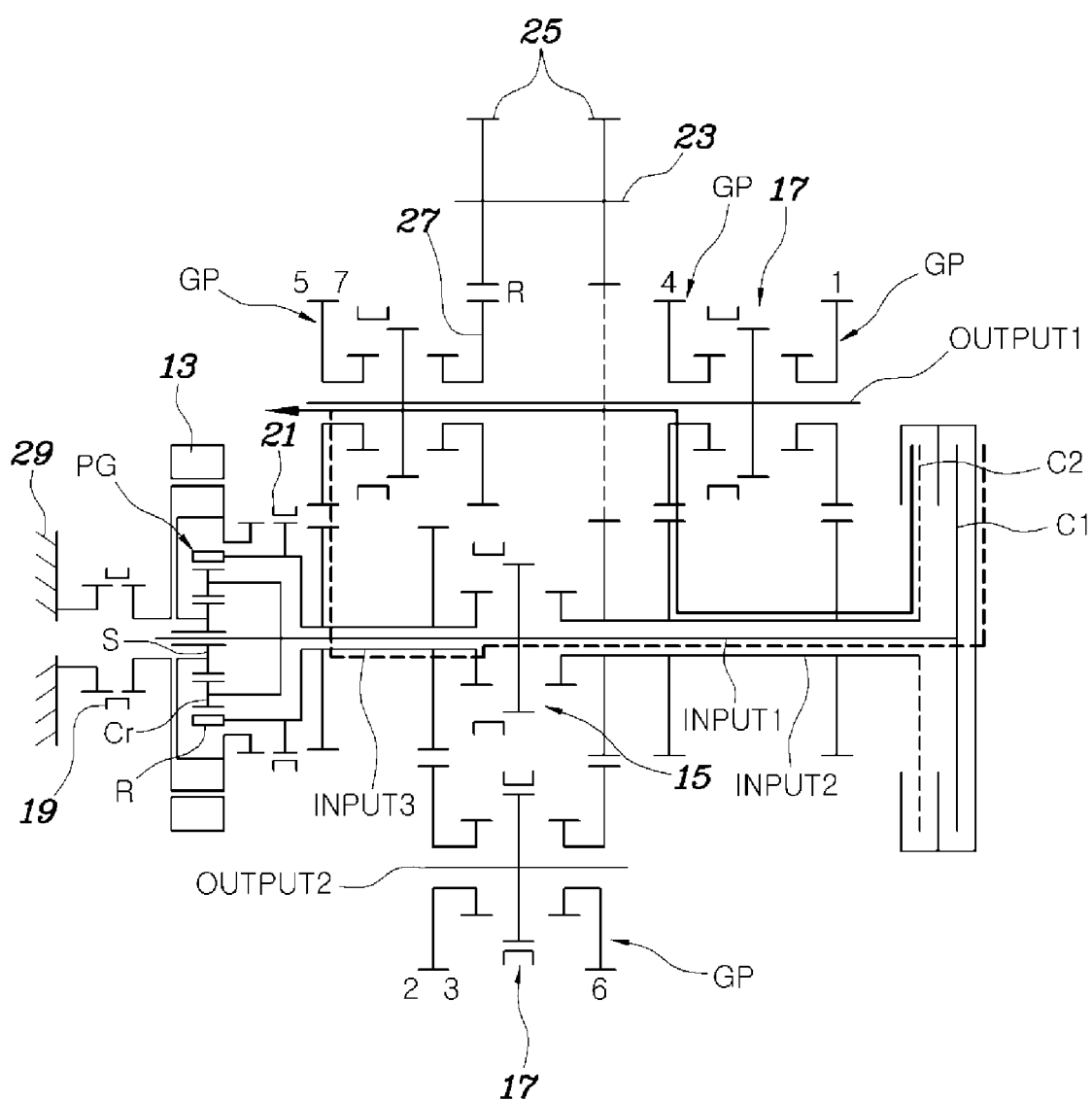
Figure 6D:
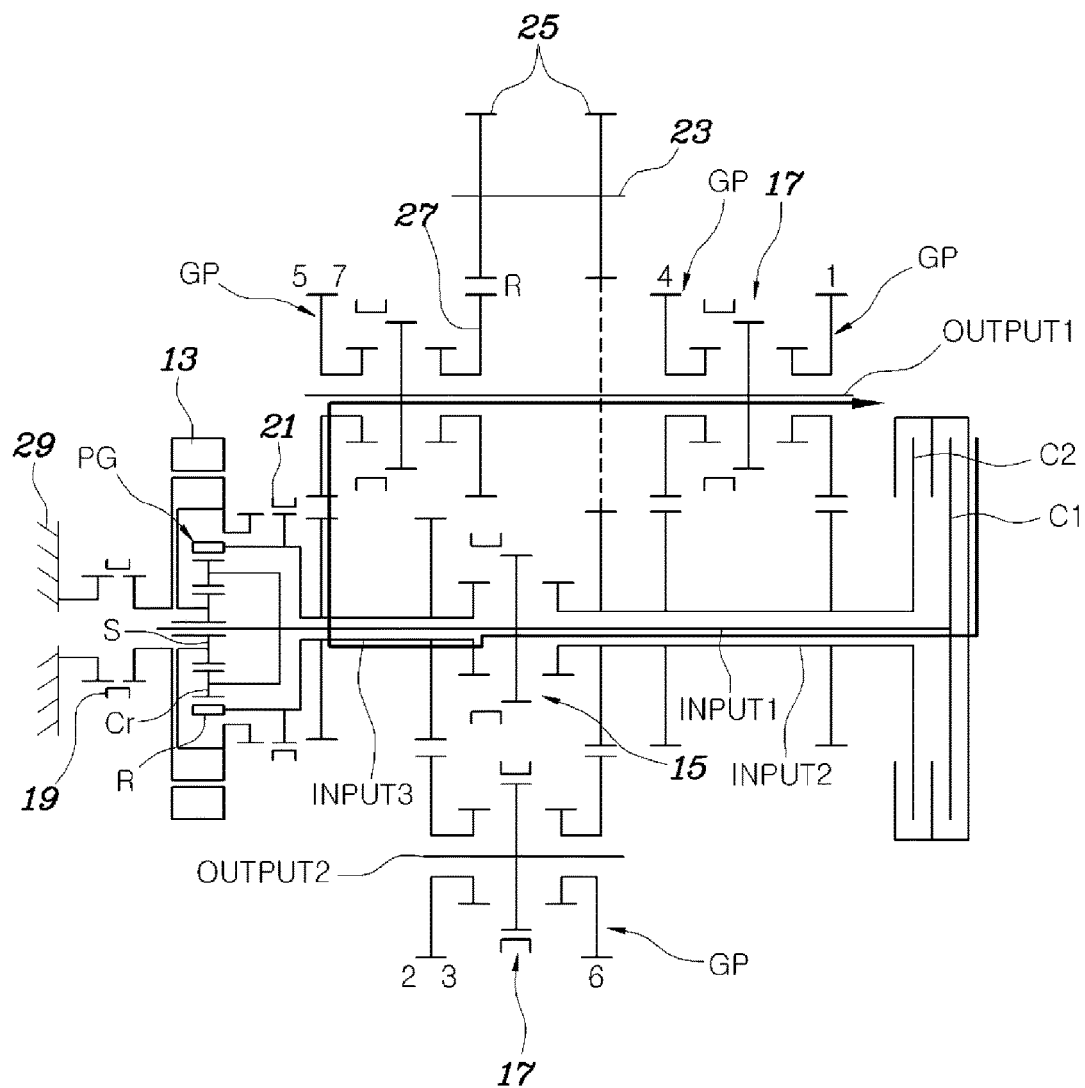
Figure 7A:
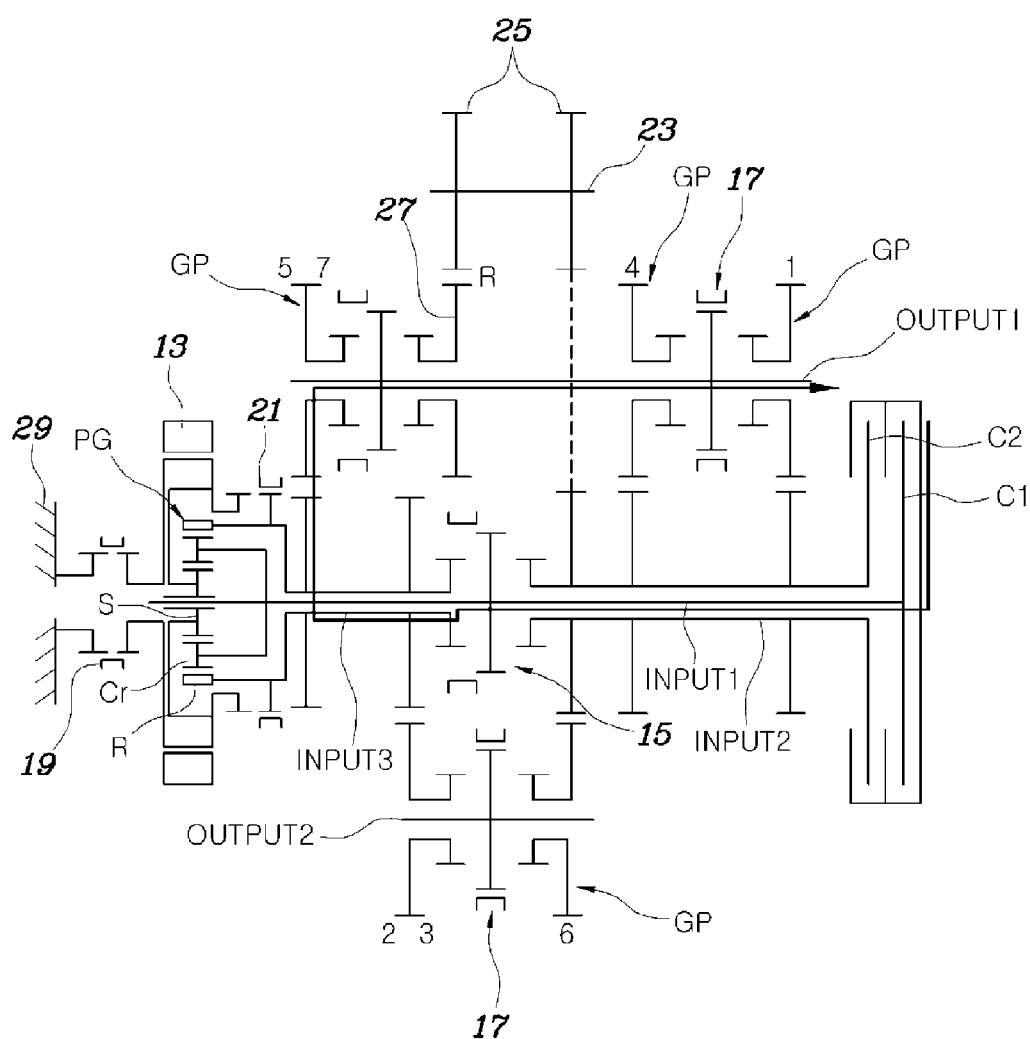
FIGS. 7A, 7B, 7C, and 7D are views illustrating a procedure when upshifting from fifth to sixth gear in an exemplary hybrid vehicle powertrain according to the present invention.
Figure 7B:
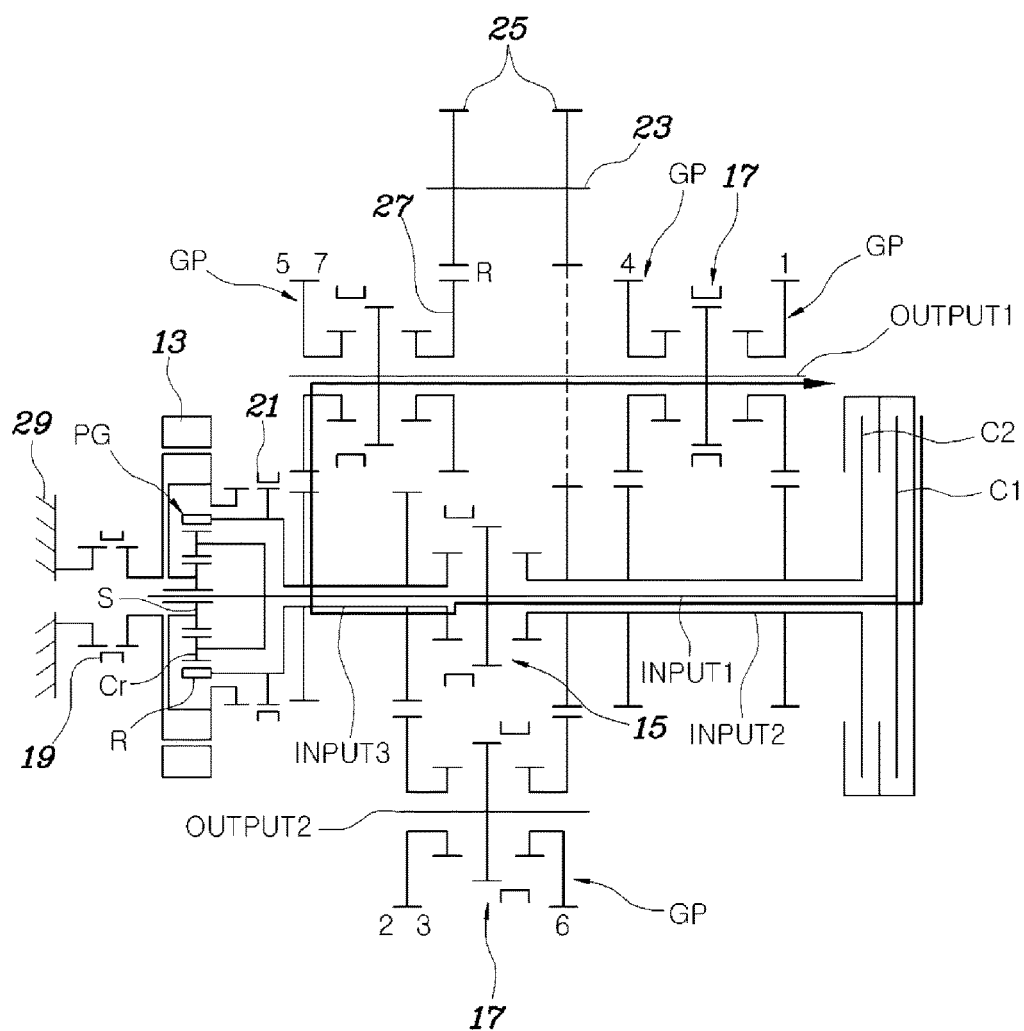
Figure 7C:
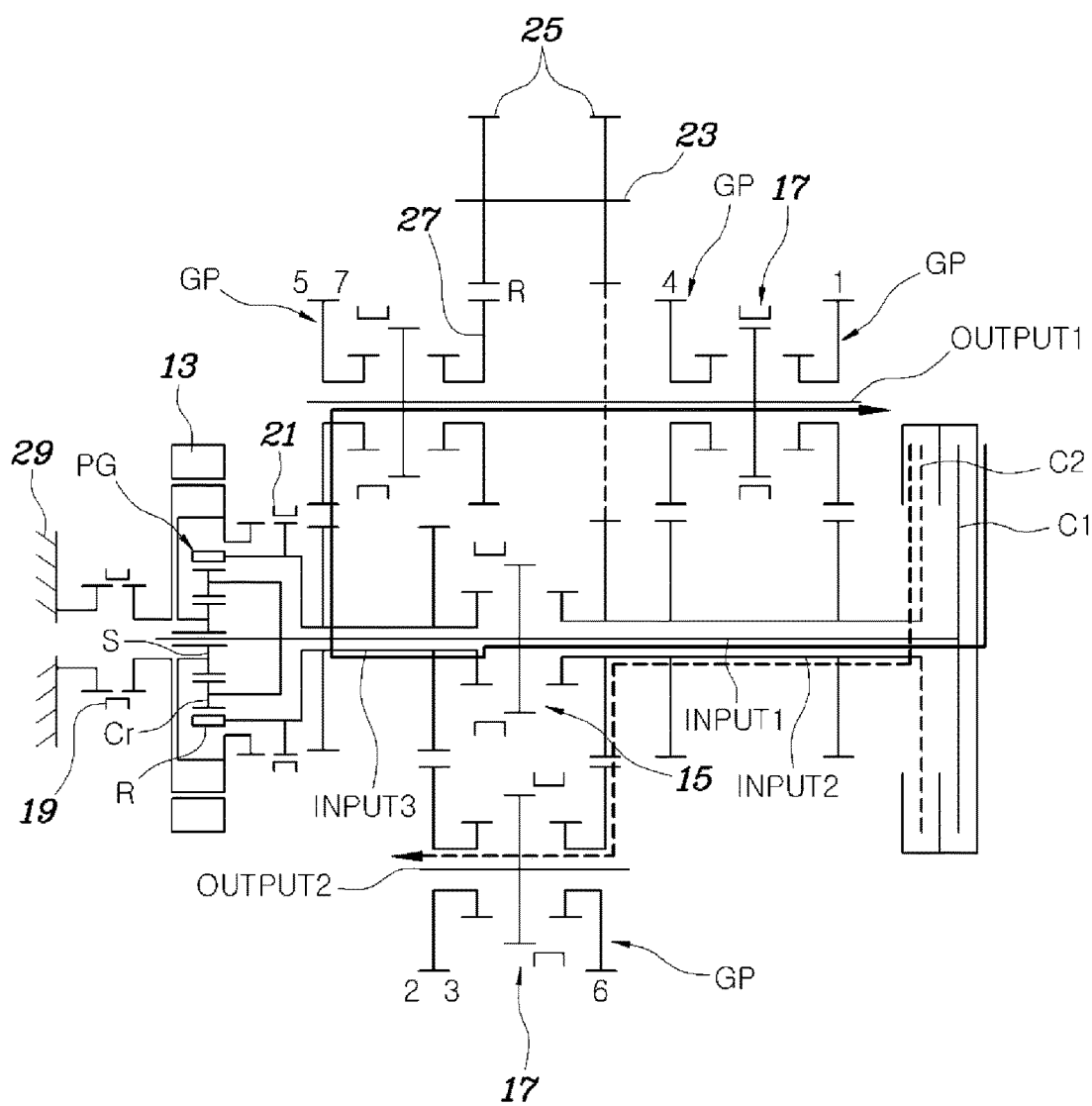
Figure 7D:
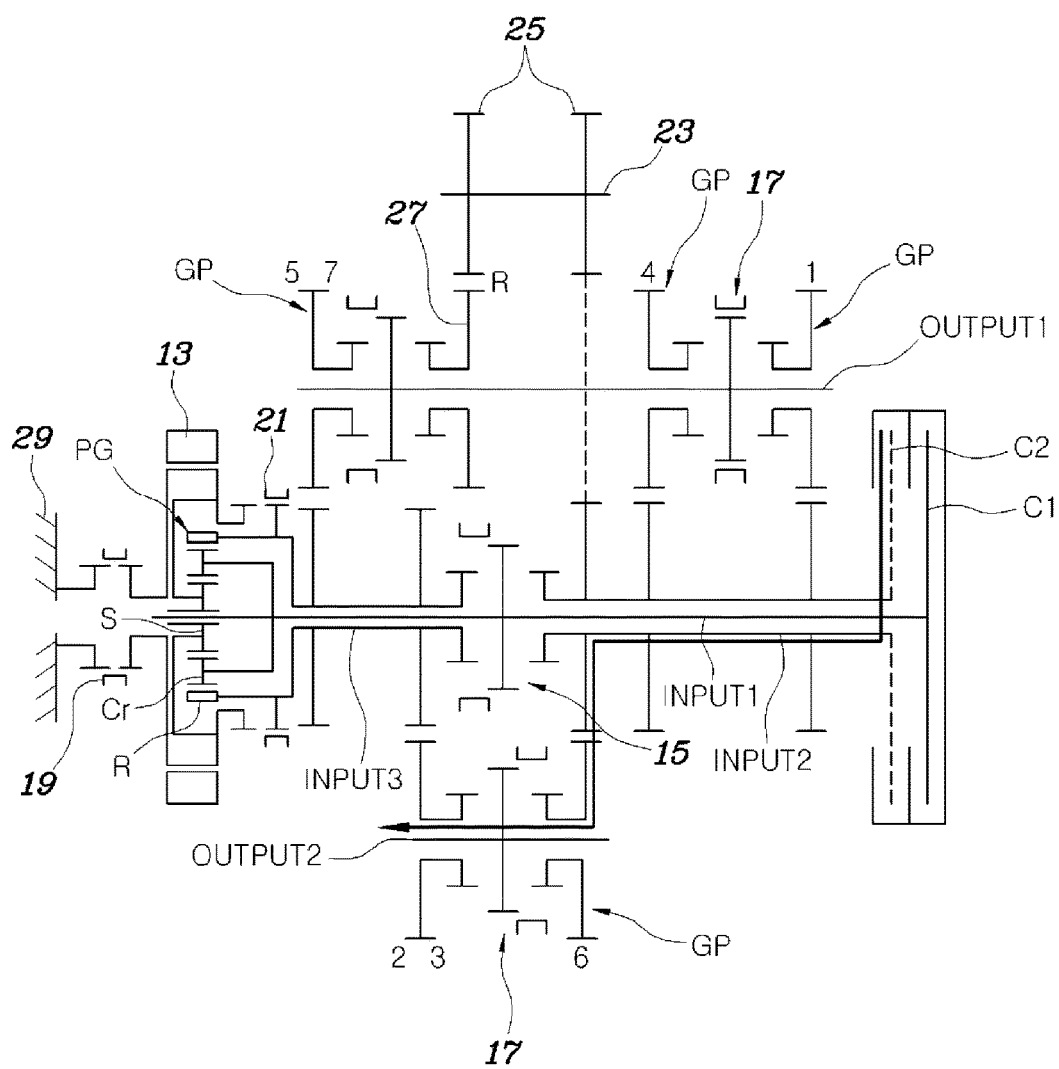

FIG. 2 is a block diagram illustrating the construction of a hybrid vehicle powertrain according to various embodiments of the present invention. The hybrid vehicle powertrain of the present invention includes a first input shaft INPUT1, a second input shaft INPUT2, a third input shaft INPUT3, a transmission path selector 15, a planetary gear unit PG, a first output shaft OUTPUT1 and a gear stage forming mechanism.

Hereinbelow, the present invention will be described in detail with reference to FIG. 2. As shown in FIG. 2, the hybrid vehicle powertrain of the present invention includes: the first input shaft INPUT1 and the second input shaft INPUT2 which are rotatably and concentrically installed and to which the rotating force of an engine 11 is transmitted under the control of a first clutch C1 and a second clutch C2; the third input shaft INPUT3 that is rotatably and concentrically installed relative to the first input shaft INPUT1; the transmission path selector 15 that brings engagement of the first input shaft INPUT1 with the second input shaft INPUT2 or with the third input shaft INPUT3, thereby transmitting the rotating force of the first input shaft INPUT1 to the second input shaft INPUT2 or to the third input shaft INPUT3; the planetary gear unit PG in which a plurality of rotary elements such as three rotary elements are installed such that the rotary elements can be rotated together, and to which the rotating force of a motor 13 or the rotating force of the engine 11 is input via a first rotary element or a second rotary element, and from which the input rotating force is output with two transmission gear ratios under the control of the first rotary element or a third rotary element in response to engagement of a first engaging unit 19 and a second engaging unit 21; the first output shaft OUTPUT1 installed parallel or substantially parallel to both the second input shaft INPUT2 and the third input shaft INPUT3; and the gear stage forming mechanism which is formed by engagement of a plurality of gear pairs GP having different transmission gear ratios with the second input shaft INPUT2, the third input shaft INPUT3 and the first output shaft OUTPUT1, and transmits the rotating force from the second input shaft INPUT2 or the third input shaft INPUT3 to the first output shaft OUTPUT1 while changing the speed of the rotating force by selecting gear pairs GP agreeing with a vehicle running speed using a gear pair selector 17.

In other words, a rotating force is input to at least one of the first input shaft INPUT1 and the third input shaft INPUT3 with two transmission gear ratios provided by the planetary gear unit PG under the selective control of the first rotary element or the third rotary element of the planetary gear unit PG. Due to the two transmission gear ratios, the input rotating force can be used to form two gear stages using one gear pair engaged with the planetary gear unit PG, so the powertrain of the present invention can remove one of two gear pairs GP conventionally required to form the two gear stages, thereby reducing the production cost and weight of the transmission, and being advantageous in packaging hybrid powertrain components.

Further, the powertrain can selectively transmit the power of the motor 13 to the second input shaft INPUT2 or to the third input shaft INPUT3, thereby increasing the number of gear stages being able to move a vehicle in an EV mode and increasing fuel efficiency.

The present invention further includes a second output shaft OUTPUT2 installed parallel or substantially parallel to both the second input shaft INPUT2 and the third input shaft INPUT3.

In addition, the gear stage forming mechanism may include the gear pair selector 17 that is formed by engagement of the second input shaft INPUT2, the third input shaft INPUT3 and the second output shaft OUTPUT2 with the plurality of gear pairs GP having different transmission gear ratios, and functions to select gear pairs GP agreeing with a vehicle running speed. Here, the gear pair selector 17 may be configured as a synchromesh mechanism.

Further, the second input shaft INPUT2 and the third input shaft INPUT3 are hollow shafts that are fitted over the first input shaft INPUT1. Here, the third input shaft INPUT3 may face the second input shaft INPUT2.

In addition, the transmission path selector 15 may be installed on the first input shaft INPUT1 at a location between the second input shaft INPUT2 and the third input shaft INPUT3 such that the transmission path selector 15 is restricted from rotating relative to the first input shaft INPUT1. Here, the transmission path selector 15 may be configured as a synchromesh mechanism.

In other words, the transmission path selector 15 is combined with the first input shaft INPUT1 so that the transmission path selector 15 and the first input shaft INPUT1 are rotated together. The transmission path selector 15 may be engaged with the second input shaft INPUT2 and with the third input shaft INPUT3 according to vehicle running conditions, such as vehicle running modes, vehicle running speeds, etc.

In addition, in some embodiments of the present invention, the second input shaft INPUT2 and the first output shaft OUTPUT1 are engaged with gear pairs GP designated to form first and fourth gears; the third input shaft INPUT3 and the first output shaft OUTPUT1 are engaged with gear pairs GP designated to form fifth and seventh gears; and the second input shaft INPUT2, the third input shaft INPUT3 and the second output shaft OUTPUT2 are engaged with gear pairs GP designated to form second, third and sixth gears, respectively.

Further, the planetary gear unit PG of the present invention may be arranged such that the planetary gear unit PG is concentric with the first input shaft INPUT1. Here, the planetary gear unit PG may form a hollow shaft into which a second end of the first input shaft INPUT1 is inserted.

Specifically, in the planetary gear unit PG, the first rotary element may be coupled to both the motor 13 and the first engaging unit 19, and may function as a selective input element or a selective fixed element; the second rotary element may be coupled to the first input shaft INPUT1, and may function as a selective input element; and the third rotary element may be coupled to the third input shaft INPUT3, may be selectively coupled to the motor 13 by the second engaging unit 21, and may function as an output element.

Here, the first rotary element may be a sun gear S, the second rotary element may be a carrier Cr, and the third rotary element may be a ring gear R, so the planetary gear unit PG may be a single pinion planetary gear unit.

Further, the first clutch C1 and the second clutch C2 may be installed on a first end of the first input shaft INPUT1, and the rotating force of the engine 11 may be transmitted to the powertrain via the first clutch C1 and the second clutch C2.

In addition, the motor 13 may be concentrically installed on the second end of the first input shaft INPUT1. Here, the motor 13 may be configured to surround the planetary gear unit PG.

In other words, in some embodiments of the present invention, the motor 13 is installed on the rear end of the transmission, so this invention does not require an engine clutch, typically installed between the engine 11 and the motor 13 in the related art powertrain, to control the transmission of engine power, thereby reducing the production cost and weight of the transmission, and being advantageous in packaging hybrid powertrain components.

In some embodiments of the present invention, the first engaging unit 19 may be configured such that the unit 19 can selectively brake the sun gear S; and the second engaging unit 21 may be configured such that the unit 21 can selectively transmit the rotating force of the motor 13 to the ring gear R.

Specifically, the first engaging unit 19 may be installed at a location between the inner surface of a transmission housing 29 and the sun gear S such that the unit 19 can be selectively engaged with the inner surface of the transmission housing 29 or with the sun gear S; and the second engaging unit 21 may be installed at a location between the motor 13 and the third input shaft INPUT3 such that the unit 21 can be selectively engaged with the motor 13 or with the third input shaft INPUT3. Here, each of the first engaging unit 19 and the second engaging unit 21 may be a dog clutch.

In other words, when shifting gears while driving a vehicle using at least one of the power of the engine 11 and the power of the motor 13, the gear-shifting to a desired gear is realized by bringing the first engaging unit 19 or the second engaging unit 21 into engagement after reducing the rpm of the sun gear S or synchronizing the rpm of the sun gear S with the rpm of the ring gear R using the rotating force of the motor 13. Here, each of the first engaging unit 19 and the second engaging unit 21 may be configured as a dog clutch having a mechanical meshing structure. When using dog clutches as the first and second engaging units 19 and 21 as described above, the selective engagement of the rotary elements in the powertrain of this invention can be realized using the dog clutches having the mechanical meshing structure instead of hydraulic wet clutches and brakes, thereby reducing the production cost and weight of a transmission and increasing fuel efficiency of the vehicle.

In the gear stage forming mechanism of the present invention, the gear pairs GP designated to form a first gear and the gear pairs GP designated to form a third gear may be provided on different input shafts and different output shafts, respectively; and the gear pairs GP designated to form a second gear and the gear pairs GP designated to form a fourth gear may be provided on different input shafts and different output shafts, respectively.

Specifically, the gear pairs GP designated to form the first gear may be provided to mesh with both the second input shaft INPUT2 and the first output shaft OUTPUT1, while the gear pairs GP designated to form the third gear may be provided to mesh with both the third input shaft INPUT3 and the second output shaft OUTPUT2.

In addition, the gear pairs GP designated to form the second gear may be provided to mesh with both the third input shaft INPUT3 and the second output shaft OUTPUT2, while the gear pairs GP designated to form the fourth gear may be provided to mesh with both the second input shaft INPUT2 and the first output shaft OUTPUT1.

In other words, during a kickdown, the input shafts designated to form the third gear and the first gear are different from each other, and the input shafts designated to form the fourth gear and the second gear are different from each other, so the powertrain can directly downshift the gears from the third gear to the first gear or from the fourth gear to the second gear without sequentially shifting the gears from the third to first gear via the second gear or without sequentially shifting the gears from fourth gear to second gear via third gear. Thus, the present invention can increase the gear shifting performance during a kickdown.

Described in more detail, in some embodiments of the present invention, gear pairs GP designated to form two different gear stages may commonly include one gear pair GP, so the present invention can output a rotating force with different transmission gear ratios using the common gear pair GP according to transmission gear ratios output from the planetary gear unit PG.

Specifically, one gear pair GP is commonly included in the gear pairs GP designated to form the second gear and in the gear pairs GP designated to form the third gear, so the common gear pair GP is commonly used when forming the second gear or the third gear. Further, one gear pair GP is commonly included in the gear pairs GP designated to form a fifth gear and in the gear pairs GP designated to form a seventh gear, so the common gear pair GP is commonly used when forming the fifth gear or the seventh gear.

Here, the common gear pair GP commonly included in the gear pairs GP designated to form the second gear and in the gear pairs GP designated to form the third gear may be installed to mesh with both the third input shaft INPUT3 and the second output shaft OUTPUT2. Further, the common gear pair GP commonly included in the gear pairs GP designated to form the fifth gear and in the gear pairs GP designated to form the seventh gear may be installed to mesh with both the third input shaft INPUT3 and the first output shaft OUTPUT1.

In other words, in the hybrid vehicle powertrain of the present invention, the planetary gear unit PG can provide two transmission gear ratios, so the powertrain can selectively provide two different transmission gear ratios using one gear pair GP. Accordingly, the present invention can reduce the number of gear pairs used to form forward gears with which the vehicle runs forward, thereby reducing the production cost and weight of the transmission As elements used to form a reverse gear, the hybrid vehicle powertrain of the present invention may further include: a reverse idler shaft 23 installed parallel or substantially parallel to the second input shaft INPUT2; a reverse idler gear 25 rotatably provided on the reverse idler shaft 23; and a reverse output gear 27 provided on the first output shaft OUTPUT1 such that the gear 27 meshes with the reverse idler gear 25.

Here, the reverse idler gear 25 may be configured to mesh with one input gear of the gear pairs GP provided in the gear stage forming mechanism, so the input gear can be commonly used when forming a forward gear stage or a reverse gear stage.

For example, the reverse idler gear 25 may be configured to mesh with the input gear of the gear pairs GP designated to form a sixth gear while meshing with the reverse output gear 27. In this case, the input gear designated to form the sixth gear may be commonly used when forming the sixth gear or the reverse gear.

In other words, the rotating force of the engine 11 or the rotating force of the motor 13 may be transmitted to the reverse output gear 27 via both the input gear designated to form the sixth gear and the reverse idler gear 25, so the reverse gear can be realized.

Hereinbelow, the power transmission paths and gear shifting actions in respective gear stages of the hybrid vehicle powertrain of the present invention will be described.

FIGS. 3A to 3D are views illustrating a procedure when upshifting from first to second gear according to the present invention.

As shown in FIGS. 3A to 3D, when the power of the engine 11 is transmitted to the second input shaft INPUT2 via the second clutch C2, a first gear is formed by the first gear pairs GP provided on both the second input shaft INPUT2 and the first output shaft OUTPUT1, so the vehicle can run at a first gear speed.

To shift the gears from the first gear to the second gear, the gear pair selector 17 meshes with the second gear pairs GP designated to form the second gear, and the first input shaft INPUT1 meshes with the third input shaft INPUT3 by the transmission path selector 15.

In addition, a handover control is performed so as to engage the first clutch C1 while disengaging the second clutch C2, so the rotating force of the engine 11 transmitted to the first input shaft INPUT1 is transmitted via the transmission path selector 15 to the second gear pairs GP provided on both the third input shaft INPUT3 and the second output shaft OUTPUT2, thereby accomplishing the procedure for shifting the gears from the first gear to the second gear. Thus, the vehicle can run at a second gear speed.

FIGS. 4A to 4D are views illustrating a procedure when upshifting from second to third gear according to the present invention. As shown in FIGS. 4A to 4D, to shift the gears from the second gear to the third gear, it is required to synchronize the rotating speed of the motor 13 with the rotating force of the engine 11a. To this end, torque is applied, at a time just before the second gear is shifted to the third gear, to the motor 13 that is being rotated during the second gear speed running mode, so the rotating speed of the motor 13 becomes synchronized with the rotating force of the engine 11.

Thereafter, the engagement formed by the transmission path selector 15 is disengaged and the rpm of the motor 13 is controlled to become reduced to zero (0), so it is possible to stop the sun gear S while preventing a quick increase in the rpm of the engine. Thereafter, the application of the power of the motor 13 is released while braking the sun gear S by the first engaging unit 19, so the rotating force of the engine 11 is input via the carrier Cr and is output with an increased speed from the ring gear R, so the powertrain makes the vehicle run at a third gear speed formed by the third gear pairs GP coupled to the ring gear R.

FIGS. 5A to 5D are views illustrating a procedure when upshifting from third to fourth gear according to the present invention. As shown in FIGS. 5A to 5D, to shift the gears from the third gear to the fourth gear, the gear pair selector 17 meshes with the fourth gear pairs GP designated to form the fourth gear.

In addition, a handover control is performed so as to engage the second clutch C2 while disengaging the first clutch C1, so the rotating force of the engine 11 transmitted to the second input shaft INPUT2 is transmitted to the fourth gear pairs GP provided on both the second input shaft INPUT2 and the first output shaft OUTPUT1, thereby accomplishing the procedure for shifting the gears from the third gear to the fourth gear. Thus, the vehicle can run at a fourth gear speed.

FIGS. 6A to 6D are views illustrating a procedure when upshifting from fourth to fifth gear according to the present invention. As shown in FIGS. 6A to 6D, to shift the gears from the fourth gear to the fifth gear, the gear pair selector 17 meshes with the fifth gear pairs GP designated to form the fifth gear, and the first input shaft INPUT1 meshes with the third input shaft INPUT3 by the transmission path selector 15.

In addition, a handover control is performed so as to engage the first clutch C1 while disengaging the second clutch C2, so the rotating force of the engine 11 transmitted to the first input shaft INPUT1 is transmitted via the transmission path selector 15 to the fifth gear pairs GP provided on both the third input shaft INPUT3 and the first output shaft OUTPUT1, thereby accomplishing the procedure for shifting the gears from the fourth gear to the fifth gear. Thus, the vehicle can run at a fifth gear speed.

FIGS. 7A to 7D are views illustrating a procedure when upshifting from fifth to sixth gear according to the present invention. As shown in FIGS. 7A to 7D, to shift the gears from the fifth gear to the sixth gear, the gear pair selector 17 meshes with the sixth gear pairs GP designated to form the sixth gear.

In addition, a handover control is performed so as to engage the second clutch C2 while disengaging the first clutch C1, so the rotating force of the engine 11 transmitted to the second input shaft INPUT2 is transmitted to the sixth gear pairs GP provided on both the second input shaft INPUT2 and the second output shaft OUTPUT2, thereby accomplishing the procedure for shifting the gears from the fifth gear to the sixth gear. Thus, the vehicle can run at a sixth gear speed.

Figure 8A:
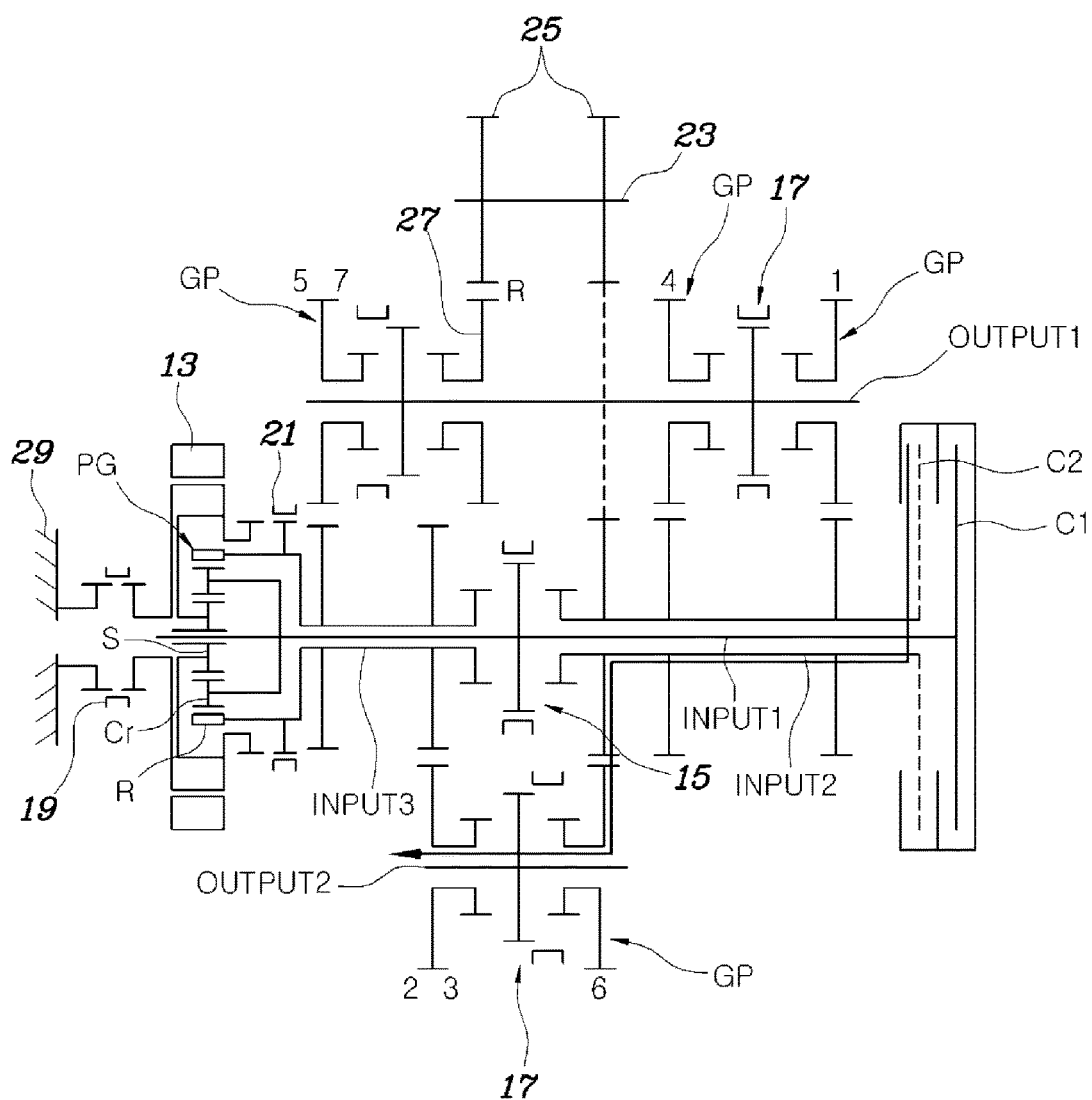
FIGS. 8A, 8B and 8C are views illustrating a procedure when upshifting from sixth to seventh gear in an exemplary hybrid vehicle powertrain according to the present invention.
Figure 8B:
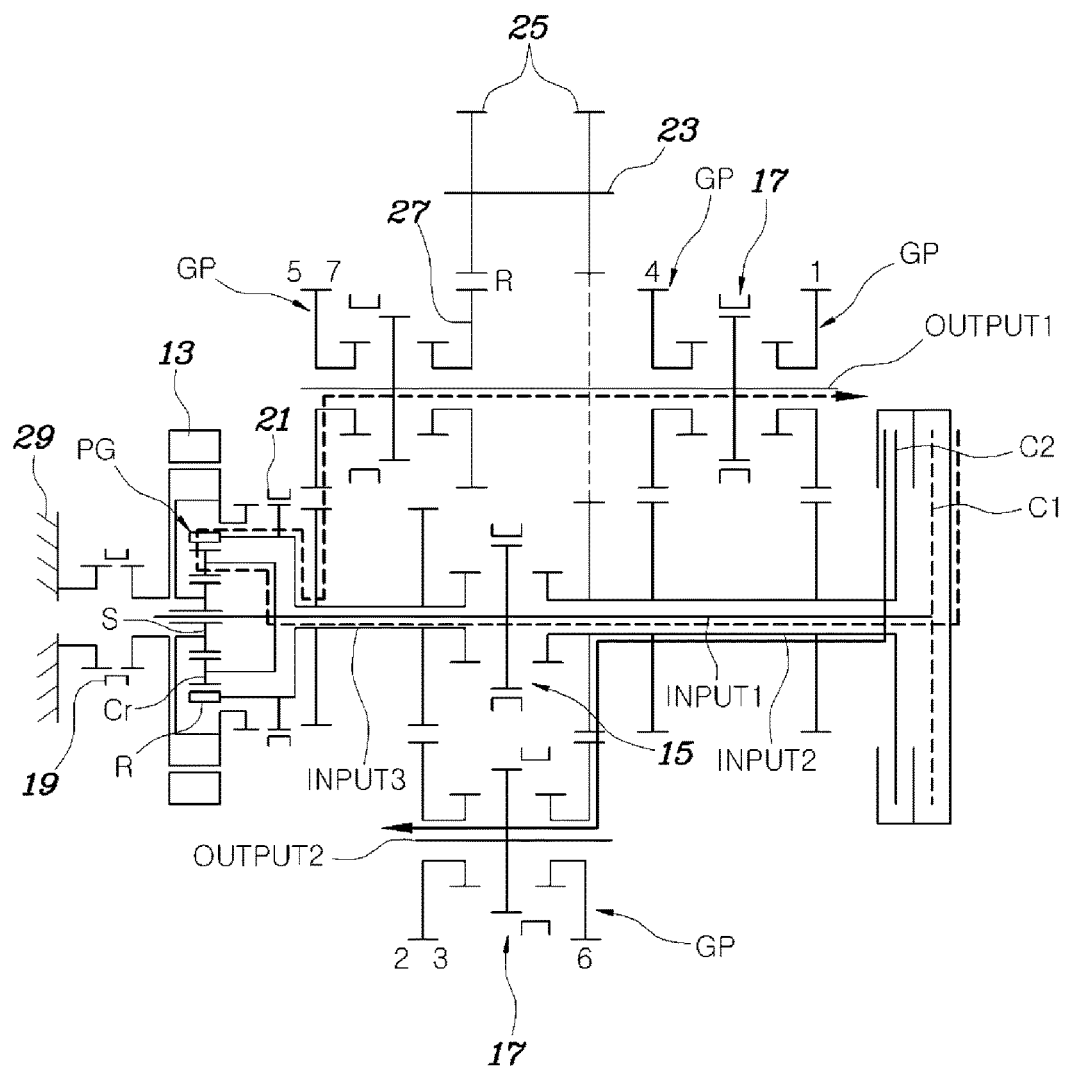
Figure 8C:
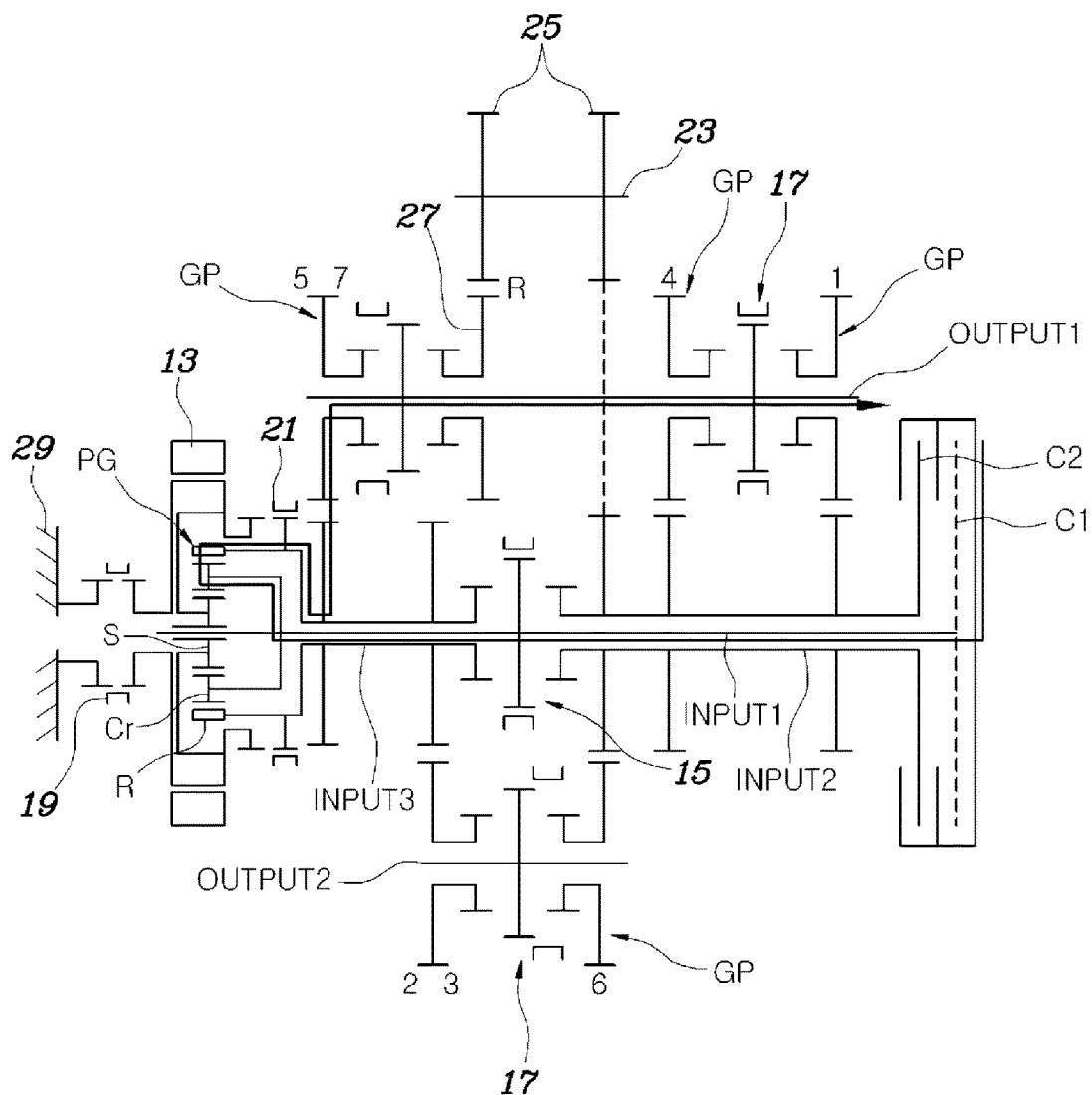

FIGS. 8A to 8C are views illustrating a procedure when upshifting from sixth to seventh gear according to the present invention. As shown in FIGS. 8A to 8C, to shift the gears from the sixth gear to the seventh gear, the rpm of the motor 13 is reduced to zero (0) and the application of the power of the motor 13 is released while braking the sun gear S by the first engaging unit 19. Thereafter, a handover control is performed so as to engage the first clutch C1 while disengaging the second clutch C2, so the rotating force of the engine 11 is input via the carrier Cr and is output with an increased speed from the ring gear R, causing the powertrain to make the vehicle run at a seventh gear speed formed by the seventh gear pairs GP coupled to both the ring gear R and the third input shaft INPUT3.

Figure 9:
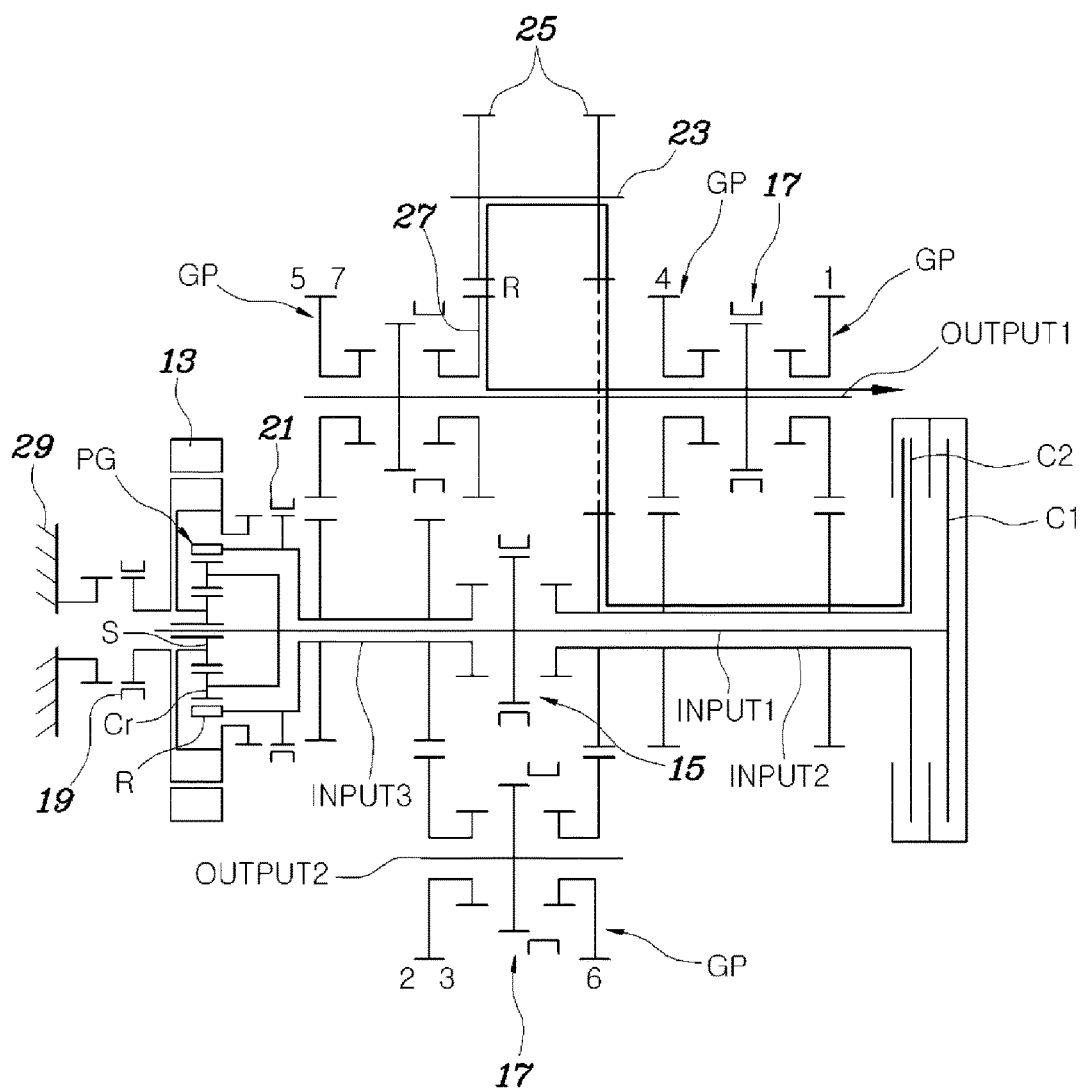
FIG. 9 is a view illustrating a power transmission path in an R-gear of an exemplary hybrid vehicle powertrain according to the present invention.
Figure 10A:
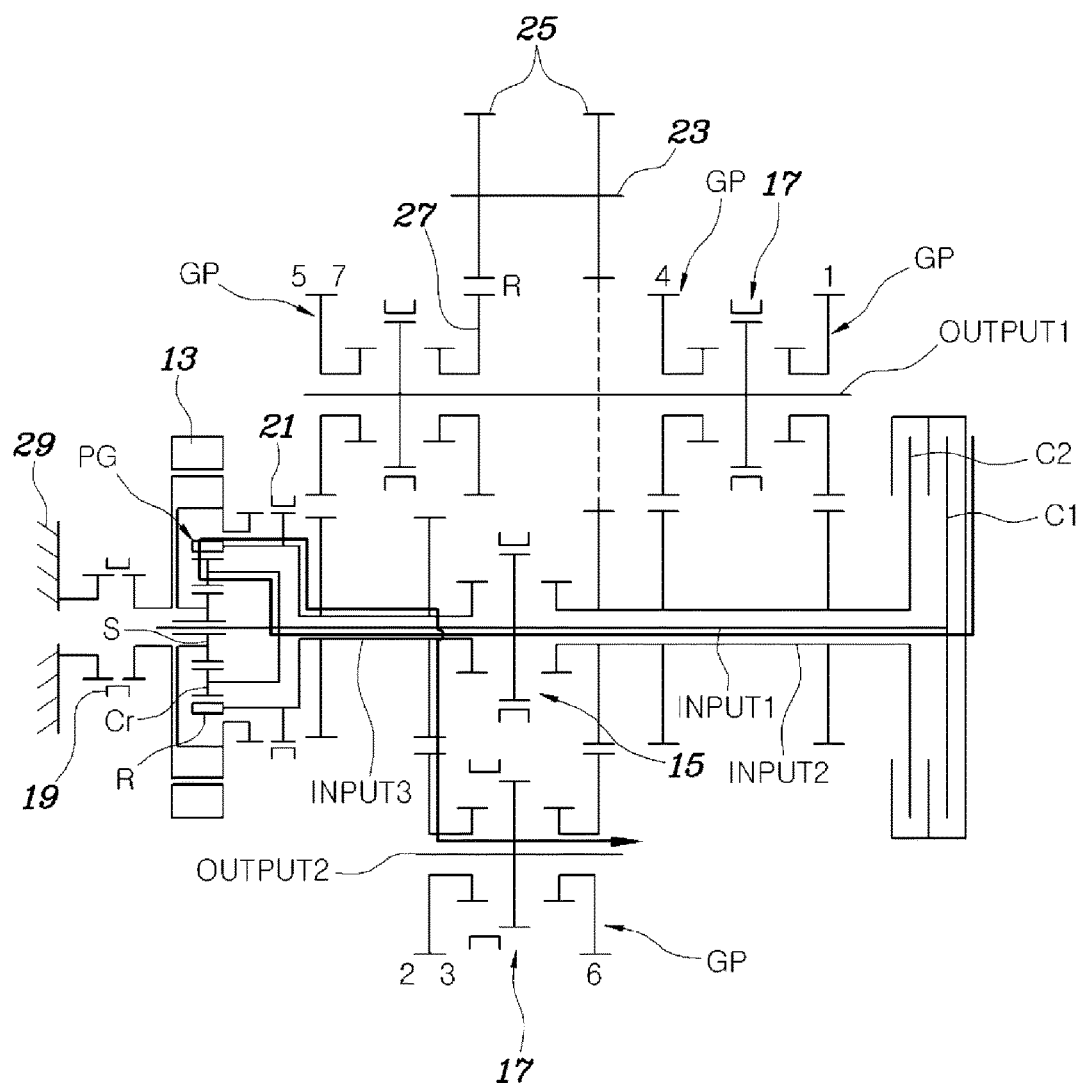
FIGS. 10A, 10B, 10 C and 10D are views illustrating a procedure when directly downshifting from third to first gear in a kickdown of an exemplary hybrid vehicle powertrain according to the present invention.
Figure 10B:
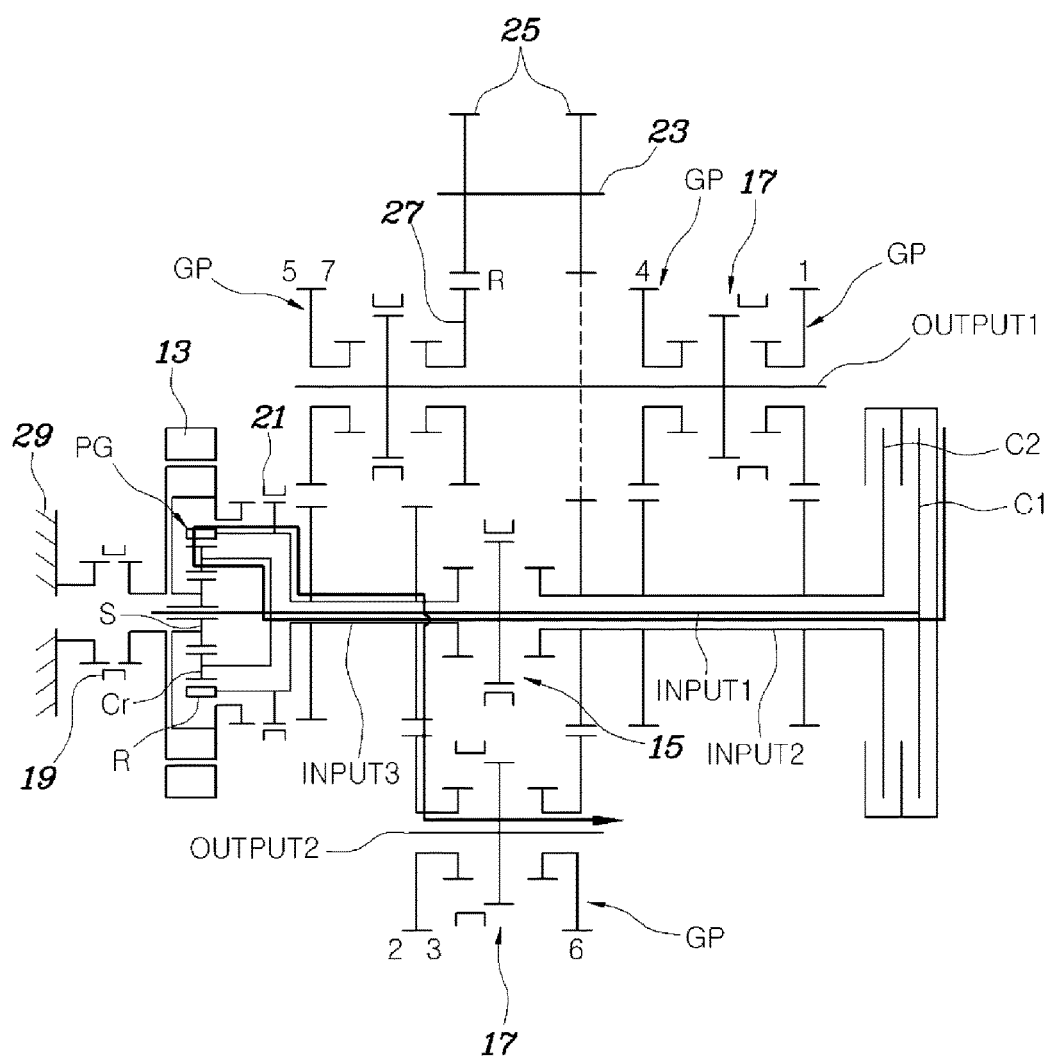
Figure 10C:
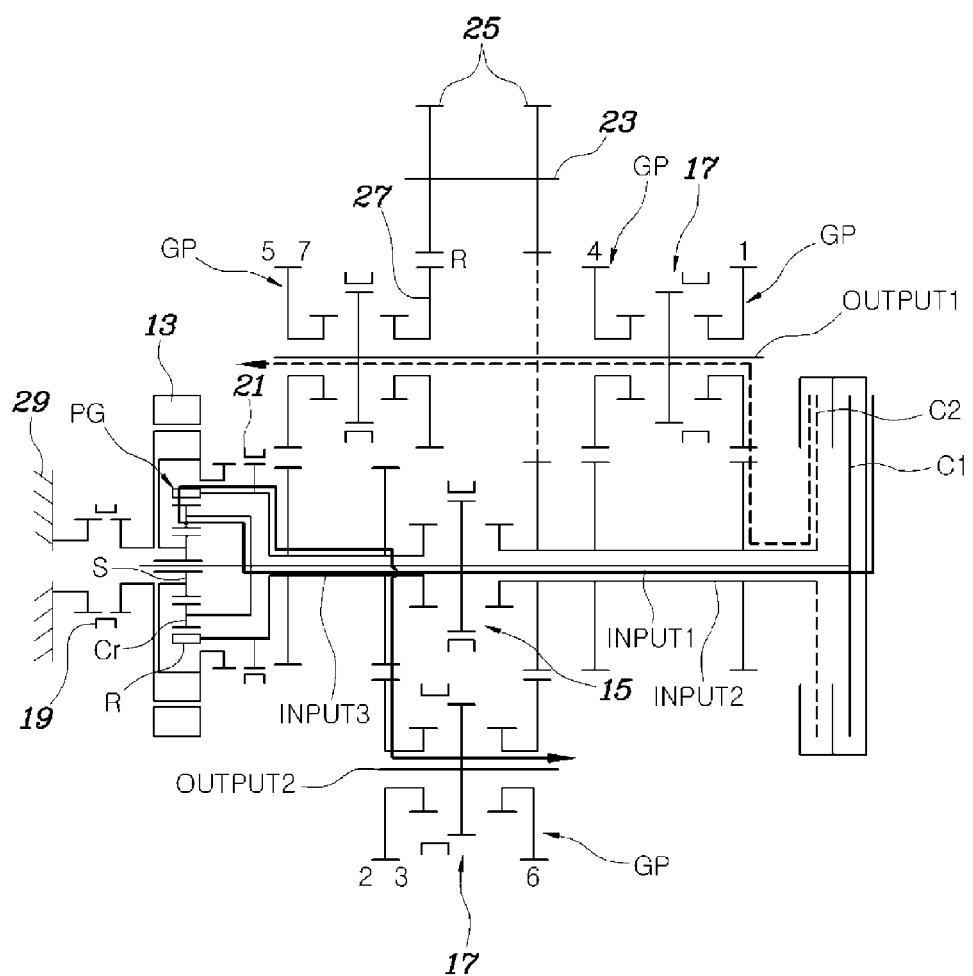
Figure 10D:
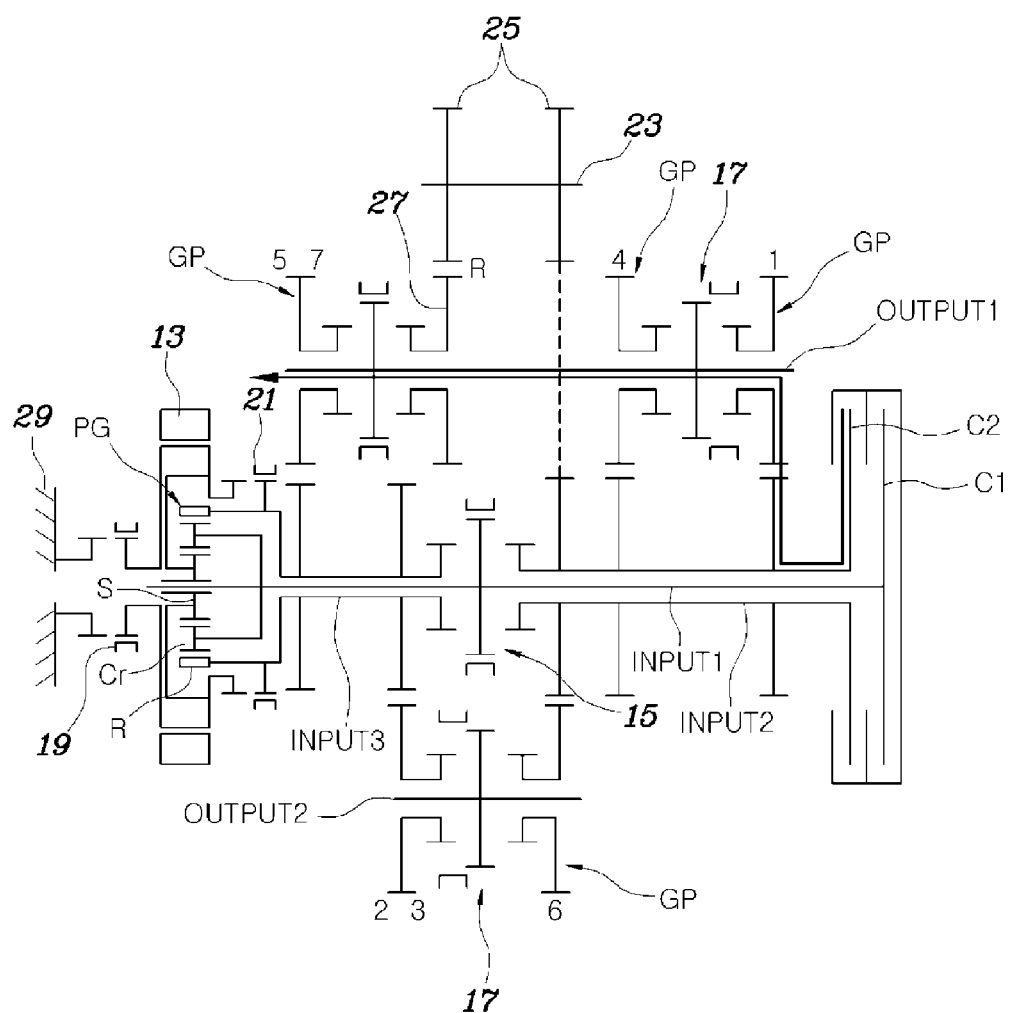
Figure 11A:
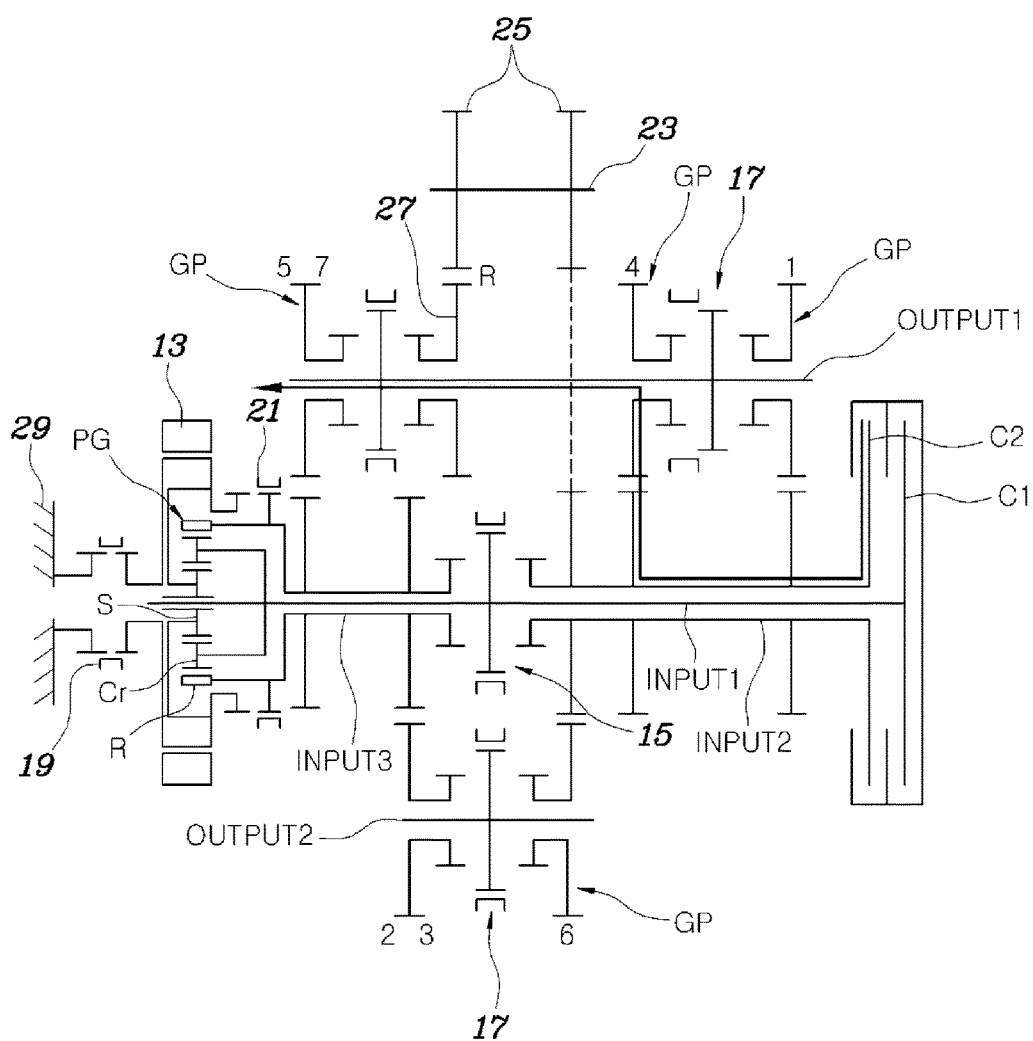
FIGS. 11A, 11B, 11C and 11D are views illustrating a procedure when directly downshifting from fourth to second gear in a kickdown of an exemplary hybrid vehicle powertrain according to the present invention.
Figure 11B:
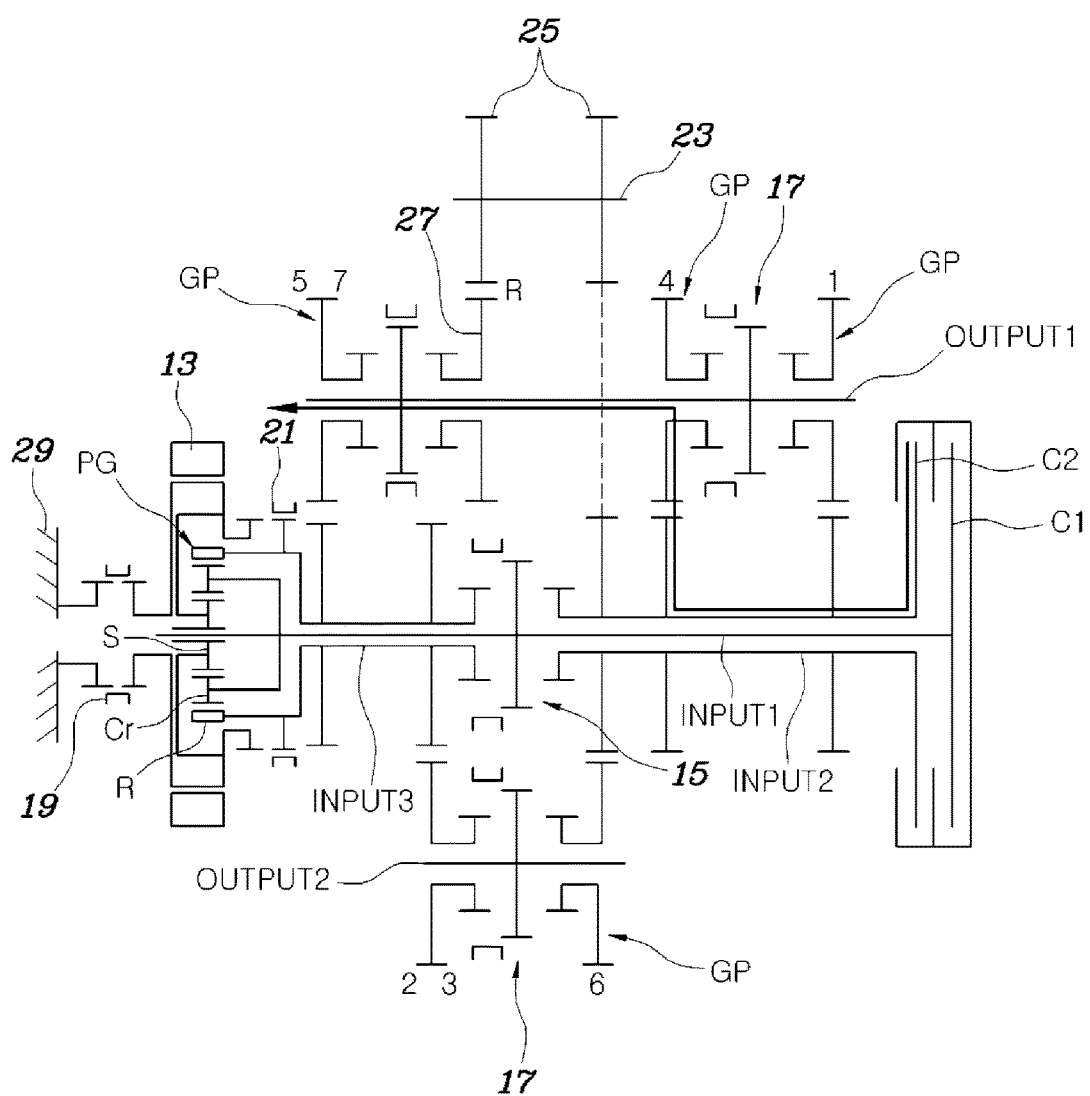
Figure 11C:
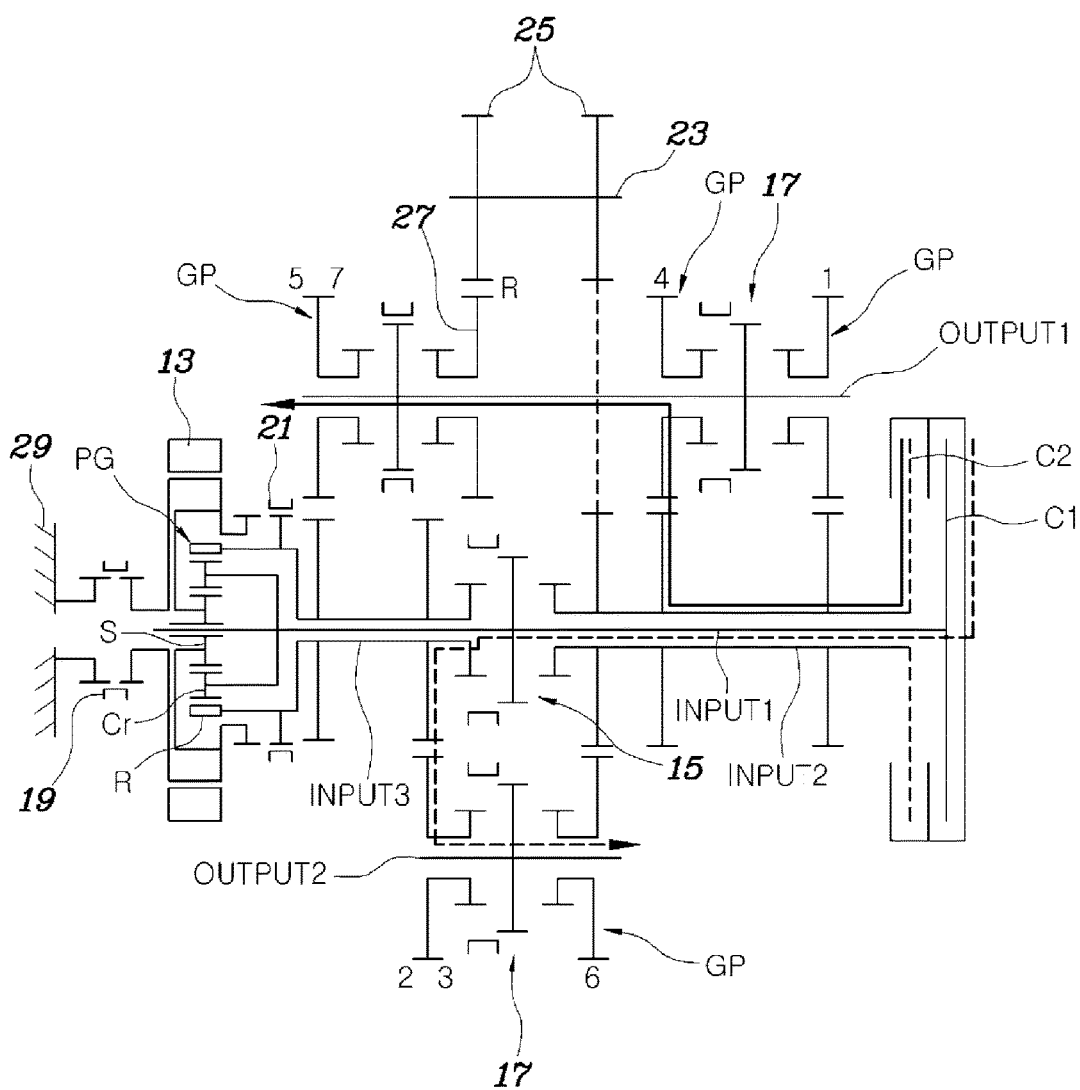
Figure 11D:
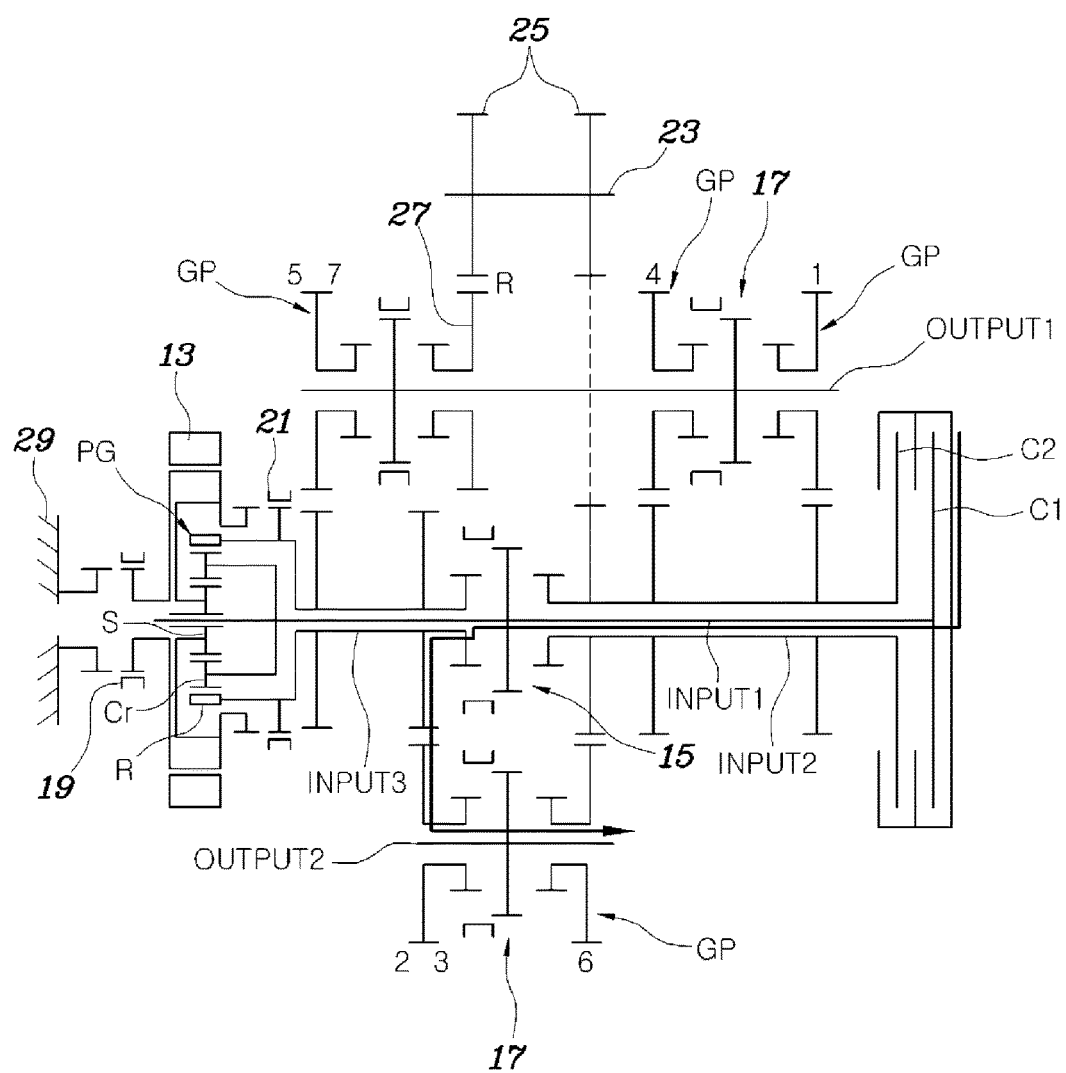
Figure 12A:
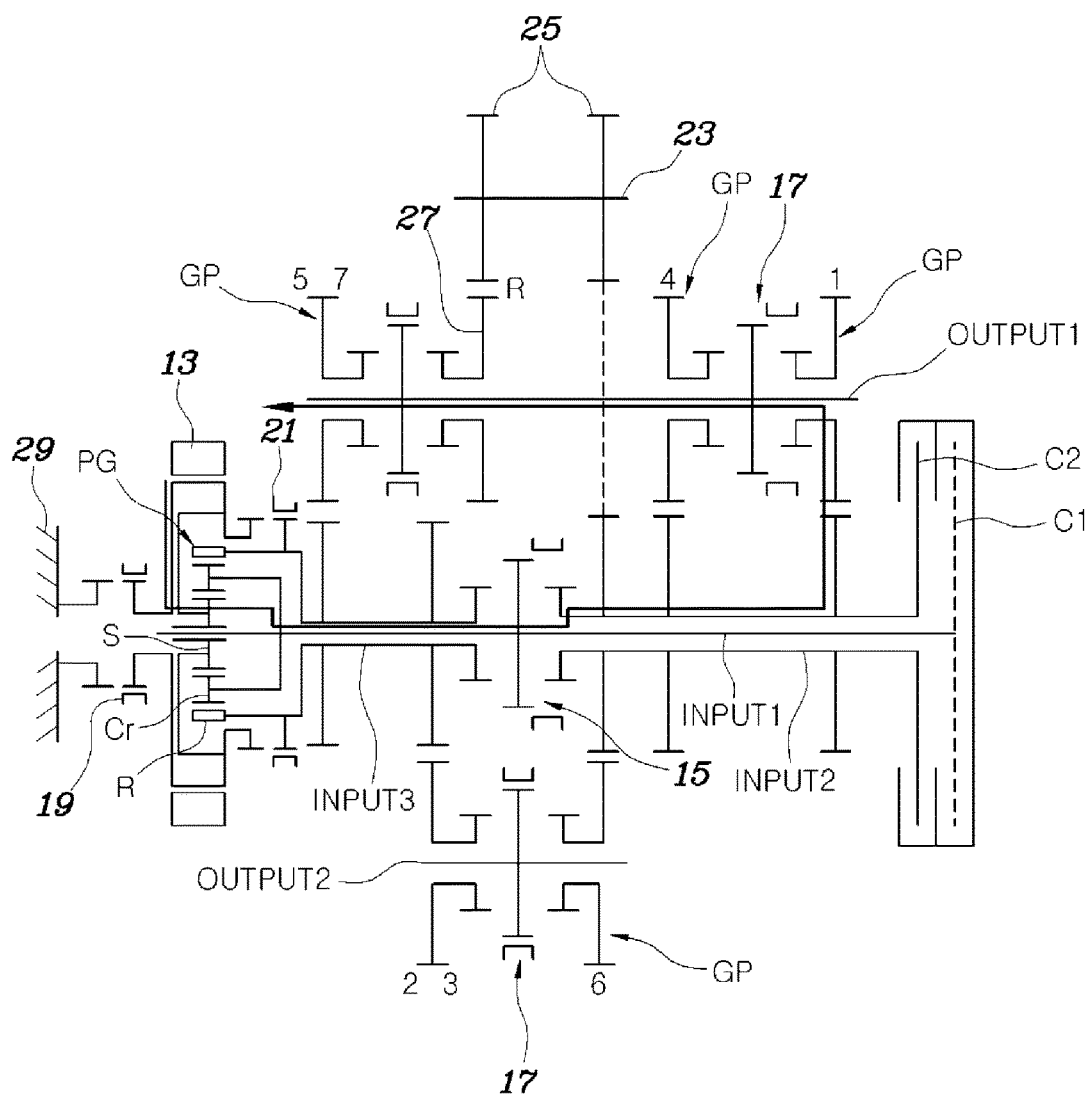
FIGS. 12A, 12B, 12C, 12D, 12E, and 12F are views illustrating power transmission paths in respective gear stages formed in an EV-mode of an exemplary hybrid vehicle powertrain according to the present invention.
Figure 12B:
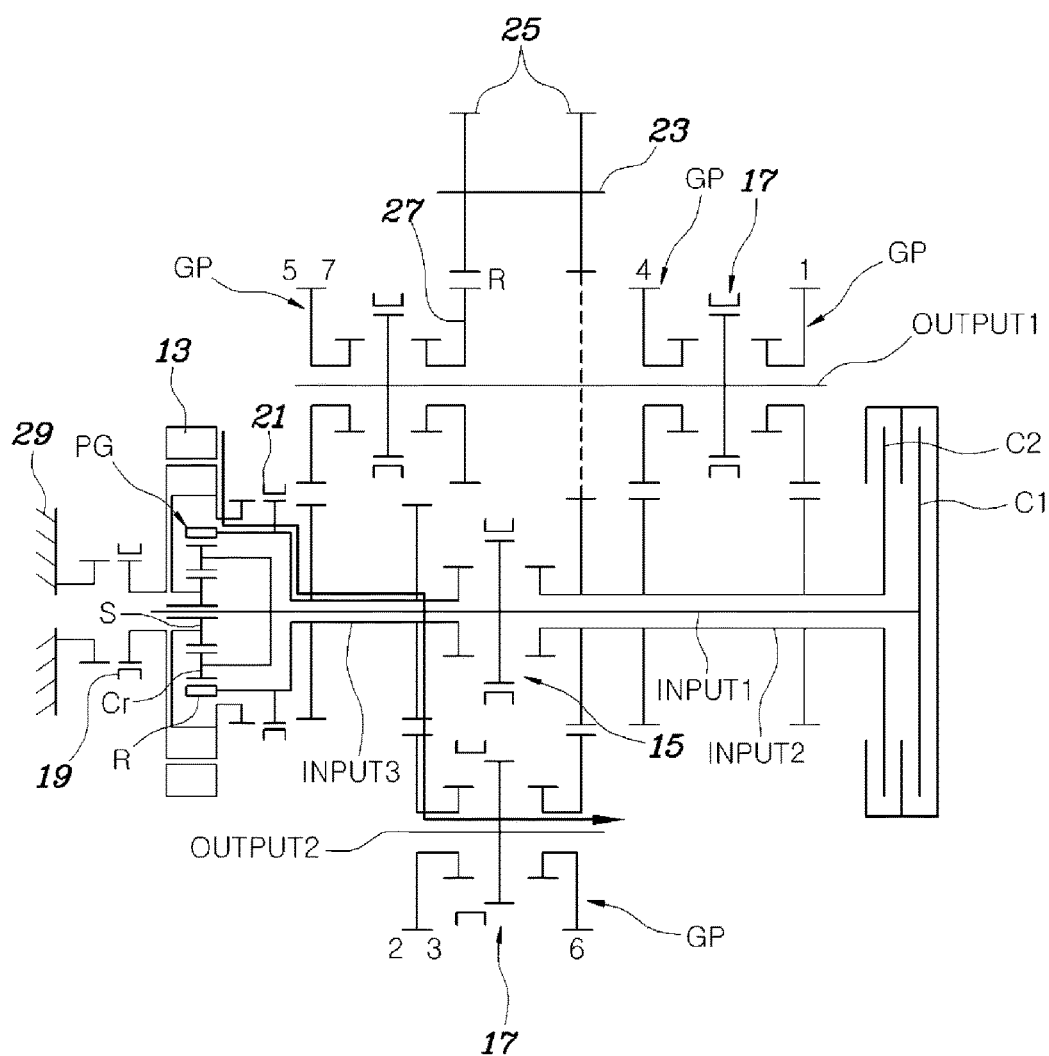
Figure 12C:
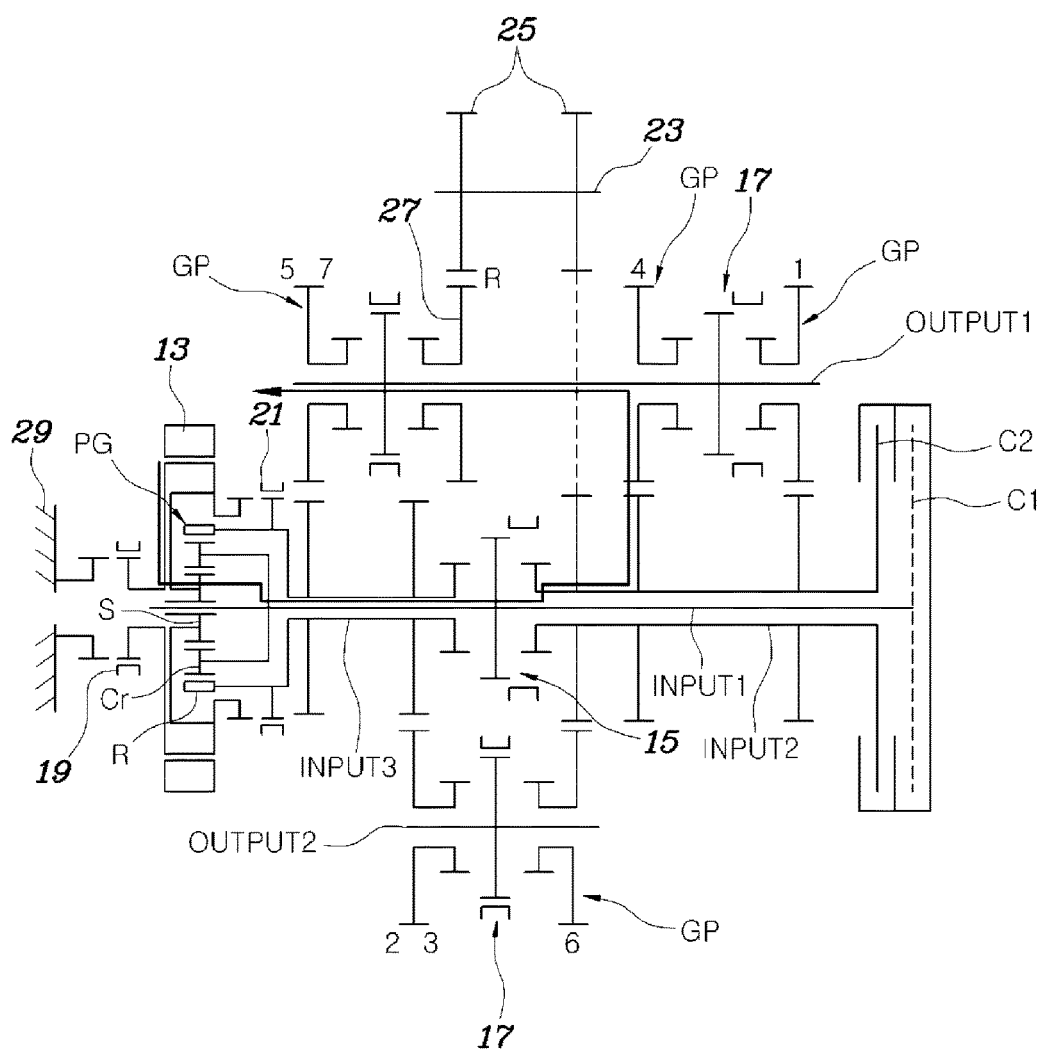
Figure 12D:
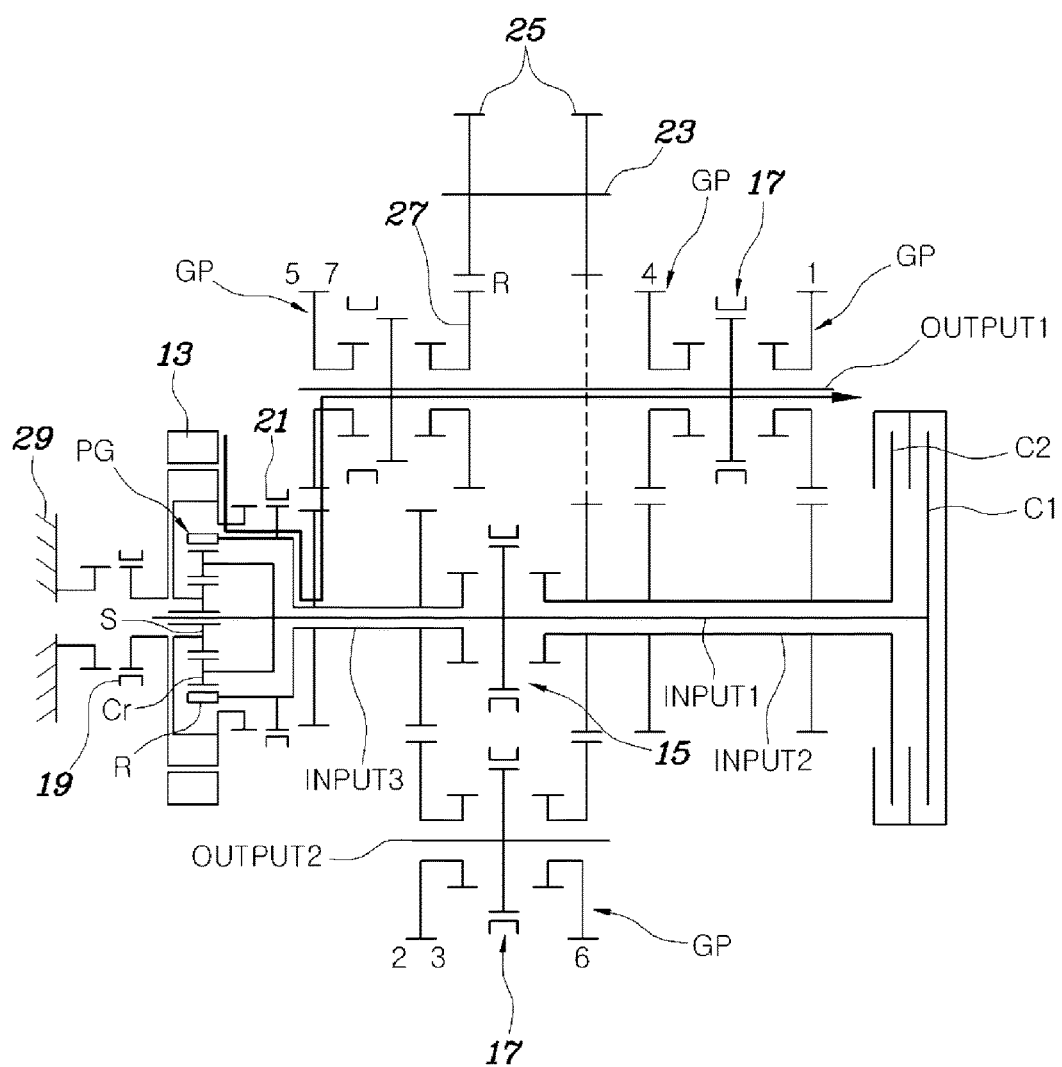
Figure 12E:
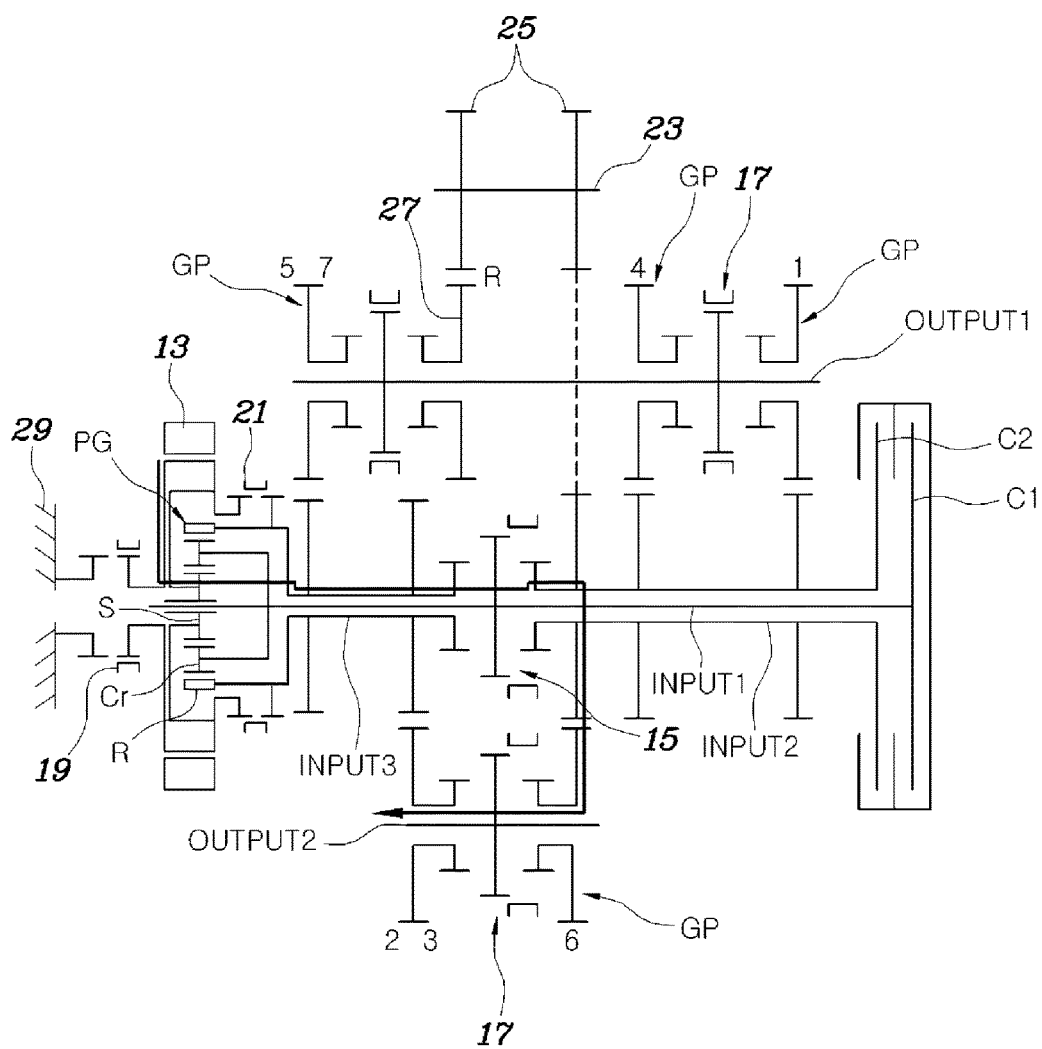
Figure 12F:
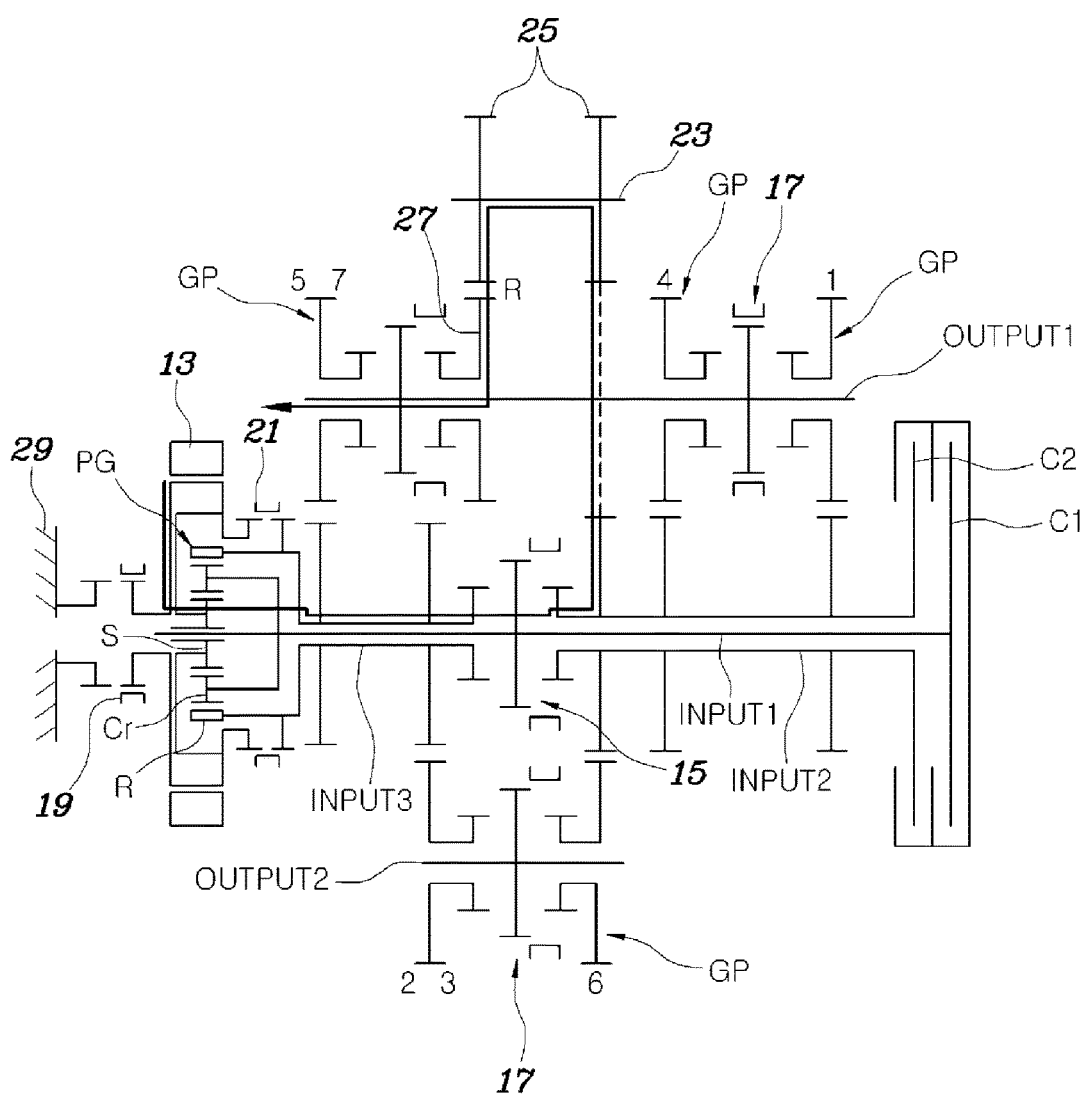

FIG. 9 is a view illustrating a power transmission path in a reverse gear of the powertrain of the present invention. As shown in FIG. 9, when shifting the gears to the reverse gear, the gear pair selector 17 meshes with the reverse output gear 27, the power of the engine 11 is transmitted to the second input shaft INPUT2 via the second clutch C2, and the reverse gear is formed by the sixth gear forming input gear provided on the second input shaft INPUT2, the reverse idler gear 25 provided on the reverse idler shaft 23 and the reverse output gear 27 provided on the first output shaft OUTPUT1, so the vehicle can move backward.

FIGS. 10A to 10D are views illustrating a procedure when directly downshifting from third to first gear in a kickdown of the powertrain according to the present invention. As shown in FIGS. 10A to 10D, when performing a kickdown while the vehicle runs at the third gear speed, the gear pair selector 17 meshes with the first gear pairs GP designated to form the first gear.

In addition, a handover control is performed so as to engage the second clutch C2 while disengaging the first clutch C1, so the rotating force of the engine 11 transmitted to the second input shaft INPUT2 is transmitted to the first gear pairs GP provided on both the second input shaft INPUT2 and the first output shaft OUTPUT1, thereby realizing the desired kickdown and making the vehicle run at the first gear speed.

FIGS. 11A to 11D are views illustrating a procedure when directly downshifting from fourth to second gear in a kickdown of the powertrain according to the present invention. As shown in FIGS. 11A to 11D, when performing a kickdown while the vehicle runs at the fourth gear speed, the gear pair selector 17 meshes with the second gear pairs GP designated to form the second gear and the first input shaft INPUT1 meshes with the third input shaft INPUT3 by the transmission path selector 15.

In addition, a handover control is performed so as to engage the first clutch C1 while disengaging the second clutch C2, so the rotating force of the engine 11 transmitted to the first input shaft INPUT1 is transmitted by the transmission path selector 15 to the second gear pairs GP provided on both the third input shaft INPUT3 and the second output shaft OUTPUT2, thereby realizing the desired kickdown and making the vehicle run at the second gear speed.

FIGS. 12A to 12F are views illustrating power transmission paths in respective gear stages formed in an EV-mode of the powertrain of the present invention. As shown in FIGS. 12A to 12F, the powertrain of the present invention can form the first gear, the second gear, the fourth gear, the fifth gear, the sixth gear or the reverse gear in the EV-mode, in which the second engaging unit 21 is brought into engagement, so the rotating speeds of the sun gear S and the ring gear R of the rotary elements of the planetary gear unit PG are synchronized with the rotating speed of the motor 13, thereby realizing direct coupling of the planetary gear unit PG and causing the planetary gear unit PG to rotate at a speed agreeing with the rotating speed of the motor 13.

In addition, when shifting the gears to the first gear, the fourth gear, the sixth gear or the reverse gear, the first input shaft INPUT1 meshes with the second input shaft INPUT2 via the transmission path selector 15, so the rotating force of the motor 13 can be transmitted via an external gear provided on the second input shaft INPUT2.

Figure 13:
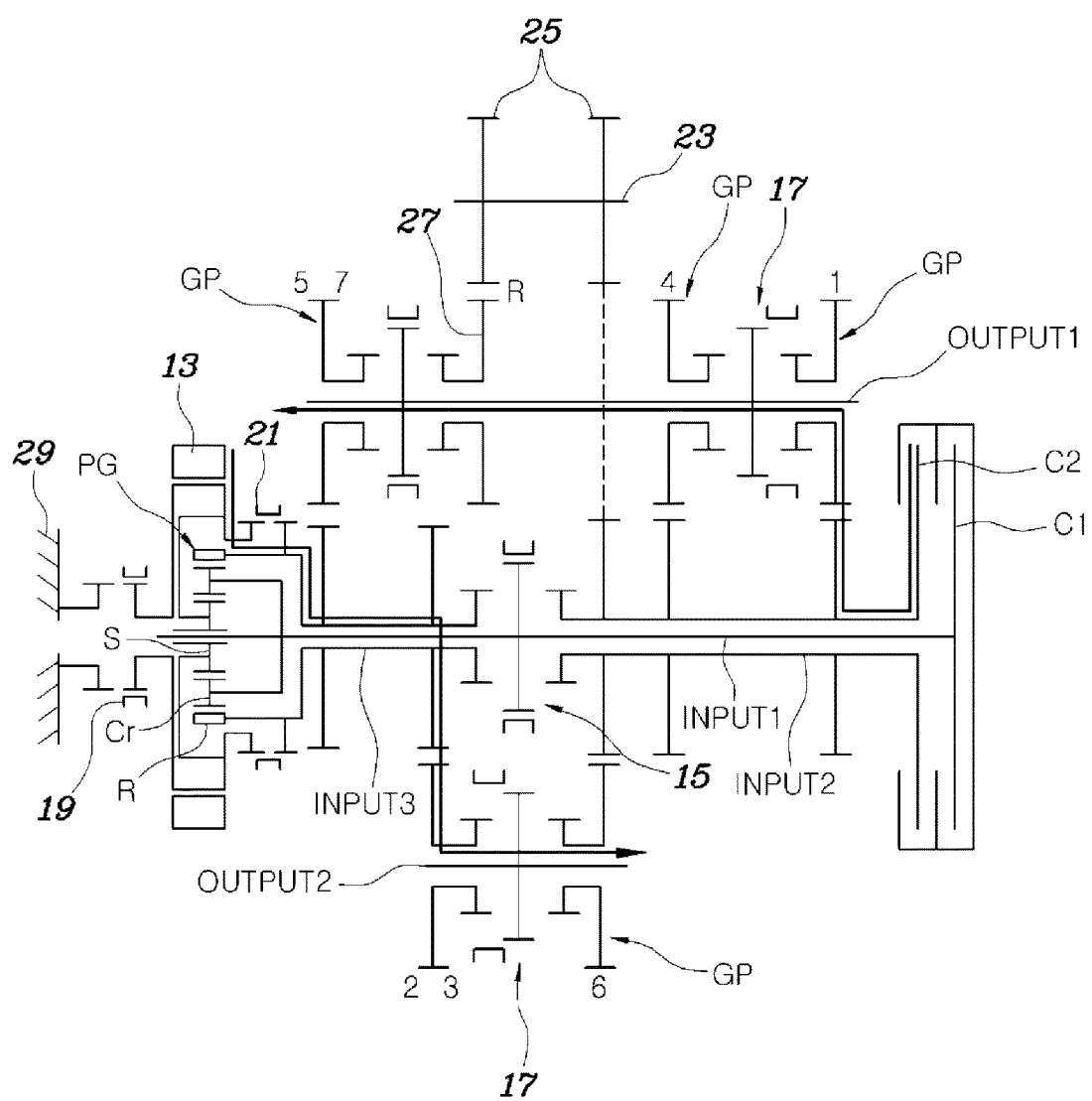
FIG. 13 is a view illustrating a power transmission path in an HEV-mode of an exemplary hybrid vehicle powertrain according to the present invention.

FIG. 13 is a view illustrating a power transmission path in an HEV-mode of the powertrain of the present invention. As shown in FIG. 13, the powertrain of the present invention may be controlled such that the power of the motor 13 can be output via the second gear pairs GP while the vehicle runs at the first gear speed using the power of the engine 11, so the powertrain can realize an HEV mode in which the power of the motor 13 is added as assistant power to the power of the engine 11. Here, in some embodiments of the present invention, the HEV mode may be realized by controlling the powertrain such that the power of the motor 13 can be output via the first gear pairs GP.

Further, although it is not shown in the accompanying drawings, the powertrain of the present invention may be controlled such that the power of the motor 13 can be output via appropriate gear pairs GP while the vehicle runs at the second gear speed, the fourth gear speed, the fifth gear speed or the sixth gear speed using the power of the engine 11, so the powertrain can realize the HEV mode in which the power of the motor 13 is added as assistant power to the power of the engine 11.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid vehicle powertrain, comprising:
    a first input shaft and a second input shaft, which are rotatably and concentrically installed and to which a rotating force of an engine is transmitted under control of a first clutch and a second clutch respectively;
    a third input shaft rotatably and concentrically installed relative to the first input shaft;
    a transmission path selector mounted between the second input shaft and the third input shaft, wherein the transmission path selector selectively engages the first input shaft with the second input shaft or the first input shaft with the third input shaft, thereby transmitting a rotating force of the first input shaft to the second input shaft or to the third input shaft;
    a planetary gear unit which includes first, second and third rotary elements, and to which a rotating force of a motor or the rotating force of the engine is input via the first rotary element or the second rotary element, and from which the input rotating force is output with any one of two transmission gear ratios under control of the first rotary element or the third rotary element in response to engagement of a first engaging unit and a second engaging unit;
a first output shaft installed parallel to both the second input shaft and the third input shaft; and
a gear stage forming mechanism formed by engagement of a plurality of gear pairs having different transmission gear ratios with the second input shaft, the third input shaft and the first output shaft, and transmitting the rotating force from the second input shaft or from the third input shaft to the first output shaft while changing a speed by selecting a gear pair in accordance with a vehicle running speed using a gear pair selector.

2. The hybrid vehicle powertrain of claim 1, further comprising:
a second output shaft installed parallel to both the second input shaft and the third input shaft, wherein the gear stage forming mechanism is formed by the engagement of the plurality of gear pairs having the different transmission gear ratios with the second input shaft, the third input shaft and the second output shaft, and includes the gear pair selector functioning to select the gear pair in accordance with the vehicle running speed.

3. The hybrid vehicle powertrain of claim 2, wherein
the second input shaft and the third input shaft are configured as hollow shafts that are fitted over the first input shaft,
the third input shaft faces the second input shaft, and
the transmission path selector is installed on the first input shaft at a location between the second input shaft and the third input shaft such that the transmission path selector is restricted from rotating relative to the first input shaft.

4. The hybrid vehicle powertrain of claim 3, wherein the transmission path selector is a synchromesh mechanism.

5. The hybrid vehicle powertrain of claim 2, wherein the planetary gear unit is arranged such that the planetary gear unit is concentric with the first input shaft, wherein the first rotary element is coupled to both the motor and the first engaging unit, and functions as a selective input element or a selective fixed element,
the second rotary element is coupled to the first input shaft, and functions as a selective input element, and
the third rotary element is coupled to the third input shaft, and is selectively coupled to the motor by the second engaging unit, and functions as an output element.

6. The hybrid vehicle powertrain of claim 5, wherein the first rotary element is a sun gear, the second rotary element is a carrier, and the third rotary element is a ring gear.

7. The hybrid vehicle powertrain of claim 6, wherein the first clutch and the second clutch are installed on a first end of the first input shaft, and the motor is configured to surround the planetary gear unit and is concentrically installed on a second end of the first input shaft.

8. The hybrid vehicle powertrain of claim 6, wherein
the first engaging unit is configured such that the first engaging unit selectively brakes the sun gear, and
the second engaging unit is configured such that the second engaging unit selectively transmits the rotating force of the motor to the ring gear.

9. The hybrid vehicle powertrain of claim 8, wherein
the first engaging unit is installed at a location between an inner surface of a transmission housing and the sun gear such that the first engaging unit is selectively engaged with the inner surface of the transmission housing or with the sun gear, and
the second engaging unit is installed at a location between the motor and the third input shaft such that the second engaging unit is selectively engaged with the motor or with the third input shaft.

10. The hybrid vehicle powertrain of claim 8, wherein the first engaging unit and the second engaging unit are dog clutches.

11. The hybrid vehicle powertrain of claim 5, wherein, in the gear stage forming mechanism,
gear pairs designated to form a first gear and gear pairs designated to form a third gear are provided on different input shafts and different output shafts, respectively, and
gear pairs designated to form a second gear and gear pairs designated to form a fourth gear are provided on different input shafts and different output shafts, respectively.

12. The hybrid vehicle powertrain of claim 11, wherein
the gear pairs designated to form the first gear are provided to mesh with both the second input shaft and the first output shaft, while the gear pairs designated to form the third gear are provided to mesh with both the third input shaft and the second output shaft, and
the gear pairs designated to form the second gear are provided to mesh with both the third input shaft and the second output shaft, while the gear pairs designated to form the fourth gear are provided to mesh with both the second input shaft and the first output shaft.

13. The hybrid vehicle powertrain of claim 5, wherein gear pairs designated to form two different gears include a common gear pair, so that the rotating force is output with different transmission gear ratios using the common gear pair according to the transmission gear ratios output from the planetary gear unit.

14. The hybrid vehicle powertrain of claim 13, wherein
a first common gear pair is commonly included in gear pairs designated to form a second gear and in gear pairs designated to form a third gear, and commonly used when forming the second gear or the third gear, and
a second common gear pair is commonly included in gear pairs designated to form a fifth gear and in gear pairs designated to form a seventh gear, and commonly used when forming the fifth gear or the seventh gear.

15. The hybrid vehicle powertrain of claim 14, wherein
the first common gear pair commonly included in the gear pairs designated to form the second gear and in the gear pairs designated to form the third gear is installed to mesh with both the third input shaft and the second output shaft, and
the second common gear pair commonly included in the gear pairs designated to form the fifth gear and in the gear pairs designated to form the seventh gear is installed to mesh with both the third input shaft and the first output shaft.

16. The hybrid vehicle powertrain of claim 2, further comprising:
a reverse idler shaft installed parallel to the second input shaft;
a reverse idler gear rotatably provided on the reverse idler shaft; and
a reverse output gear provided on the first output shaft such that the reverse output gear meshes with the reverse idler gear.

17. The hybrid vehicle powertrain of claim 16, wherein the reverse idler gear is configured to mesh with an input gear of the gear pairs provided in the gear stage forming mechanism.

* * * * *